(12) United States Patent
Zhao et al.

(10) Patent No.: US 12,407,633 B2
(45) Date of Patent: Sep. 2, 2025

(54) MESSAGE PROCESSING METHOD AND APPARATUS

(71) Applicant: Huawei Technologies Co., Ltd., Shenzhen (CN)

(72) Inventors: Cong Zhao, Xi'an (CN); Zhaoyang Li, Xi'an (CN); Chenpeng Yang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/549,706

(22) PCT Filed: Mar. 9, 2022

(86) PCT No.: PCT/CN2022/079984
§ 371 (c)(1),
(2) Date: Sep. 8, 2023

(87) PCT Pub. No.: WO2022/188815
PCT Pub. Date: Sep. 15, 2022

(65) Prior Publication Data
US 2024/0305591 A1    Sep. 12, 2024

(30) Foreign Application Priority Data

Mar. 12, 2021 (CN) .......................... 202110269697.2

(51) Int. Cl.
*H04L 51/04* (2022.01)
*H04L 12/18* (2006.01)
*H04L 51/046* (2022.01)

(52) U.S. Cl.
CPC ............ *H04L 51/04* (2013.01); *H04L 12/185* (2013.01); *H04L 51/046* (2013.01)

(58) Field of Classification Search
CPC ...... H04L 51/04; H04L 12/185; H04L 51/046
See application file for complete search history.

(56) References Cited

U.S. PATENT DOCUMENTS

| | | | |
|---|---|---|---|
| 2005/0220064 A1 | 10/2005 | Hundscheidt et al. | |
| 2014/0122672 A1* | 5/2014 | Chen ................... | H04L 41/0893 709/221 |
| 2020/0265365 A1* | 8/2020 | Kim ...................... | G06Q 10/10 |

FOREIGN PATENT DOCUMENTS

| | | |
|---|---|---|
| CN | 1859323 A | 11/2006 |
| CN | 107147505 A | 9/2017 |

(Continued)

*Primary Examiner* — David R Lazaro
*Assistant Examiner* — Mariegeorges A Henry
(74) *Attorney, Agent, or Firm* — Slater Matsil, LLP

(57) ABSTRACT

In accordance with an embodiment. a message processing method applied to a server includes: receiving a first packet sent by a first client, where the first packet includes a receiving object identifier set and a message list, the receiving object identifier set includes an identifier of at least one receiving object, and the message list includes at least one first message; determining, based on the receiving object identifier set, at least one second user that receives the at least one first message; and for any second user of the at least one second user, generating a second packet, and sending the second packet to a second client to which the second user logs in, where the second packet includes an identifier of a receiving object corresponding to the second user and the message list.

20 Claims, 14 Drawing Sheets

FIG. 5

(56) References Cited

FOREIGN PATENT DOCUMENTS

| | | | | |
|---|---|---|---|---|
| CN | 110545237 A | * | 12/2019 | |
| CN | 110912803 A | | 3/2020 | |
| CN | 111367444 A | * | 7/2020 | |
| CN | 112334932 A | * | 2/2021 | ........... G06Q 20/102 |
| DE | 102004008584 A1 | * | 9/2005 | ............. H04L 12/18 |
| EP | 4261673 A1 | * | 10/2023 | ........... G06F 3/0481 |
| WO | WO-2020096087 A1 | * | 5/2020 | ............. G06Q 50/30 |

* cited by examiner

| TCP header | Protocol header | | | | | Service header | | | Service data | |
|---|---|---|---|---|---|---|---|---|---|---|
| | Total length | Version number | Service type | Control | Trace identification number | Sub-message type | Length of a service header corresponding to the sub-message type | Service header of the sub-message type | Service data of the sub-message type | |
| ... | 2 bytes | 2 bytes | 1 byte | 1 byte | 8 bytes | 2 bytes | 2 bytes | Variable length | Variable length | |

FIG. 3B

MESSAGE PROCESSING METHOD AND APPARATUS

CROSS-REFERENCE TO RELATED APPLICATIONS

This application is a National Stage of International Application No. PCT/CN2022/079984, filed on Mar. 9, 2022, which claims priority to Chinese Patent Application No. 202110269697.2, filed on Mar. 12, 2021, both of which are hereby incorporated by reference in their entireties.

TECHNICAL FIELD

This application relates to the field of communication technologies, and in particular, to a message processing method and apparatus.

BACKGROUND

In instant messaging, a user may use an instant messaging application to implement point-to-point and point-to-multipoint message sending on a network. There are two manners in which the instant messaging application forwards messages: one-by-one forwarding and merged forwarding. In the one-by-one forwarding manner, messages selected by the user are forwarded one by one. Each forwarded message has a message identifier, indicating a different message. In the merged forwarding manner, all messages selected by the user are forwarded together. After being forwarded, all the selected messages have a unified message identifier, indicating a same message.

In one-by-one forwarding, each message needs to be processed. Therefore, in a process of forwarding messages in the one-by-one forwarding manner, problems such as a large quantity of packets uploaded by a message uploading client, a large quantity of packets downloaded by a message receiving client, and a large quantity of times of interaction between a client and a server may occur, resulting in high client traffic consumption.

SUMMARY

In view of this, a message processing method and apparatus are provided, to reduce a quantity of uploaded and delivered packets, and reduce client traffic consumption when messages are forwarded one by one.

According to a first aspect, an embodiment of this application provides a message processing method. The method is applied to a server, and the method includes: receiving a first packet sent by a first client, where the first packet includes a receiving object identifier set and a message list, the receiving object identifier set includes an identifier of at least one receiving object, and the message list includes at least one first message; determining, based on the receiving object identifier set, at least one second user that receives the at least one first message; and for any second user of the at least one second user, generating a second packet, and sending the second packet to a second client to which the second user logs in, where the second packet includes an identifier of a receiving object corresponding to the second user and the message list.

In this embodiment of this application, when messages are forwarded one by one, the messages are merged, to reduce a quantity of packets delivered by the server, reduce a quantity of times of interaction between a client and the server, and further reduce client traffic consumption.

According to the first aspect, in a first possible implementation of the message processing method, the at least one receiving object includes a member and/or a group, and the receiving object identifier set includes a member identifier set and/or a group identifier set. The member identifier set includes a member identifier of each member in the at least one receiving object, and the group identifier set includes a group identifier of each group in the at least one receiving object.

The determining, based on the receiving object identifier set, at least one second user that receives the at least one first message includes: for a member identifier set in the receiving object identifier set, determining a first member set based on a member identifier in the member identifier set; for a group identifier set in the receiving object identifier set, determining at least one first group based on a group identifier in the group identifier set, and determining at least one second member set based on a member identifier of each member included in the at least one first group; and merging the first member set and the at least one second member set to obtain the at least one second user.

In this way, the client traffic consumption can be reduced in a scenario in which the messages are forwarded one by one to a user who is a single member, the messages are forwarded one by one to a user who is in a group, or the messages are forwarded one by one to a user who is both a single member and a user in a group.

According to the first possible implementation of the first aspect, in a second possible implementation of the message processing method, in a second packet generated for a second user that belongs to the first member set, the identifier of the receiving object corresponding to the second user includes a member identifier corresponding to the second user.

According to the first possible implementation of the first aspect, in a third possible implementation of the message processing method, in a second packet generated for a second user that belongs to the at least one second member set, the identifier of the receiving object corresponding to the second user includes a group identifier corresponding to a second member set to which the second user belongs.

In this way, at least one message may be sent based on one second packet when the messages are forwarded one by one to the user who is the single member.

According to the first possible implementation of the first aspect, in a fourth possible implementation of the message processing method, in a second packet generated for a second user that belongs to both the first member set and the at least one second member set, the identifier of the receiving object corresponding to the second user includes a member identifier corresponding to the second user and a group identifier corresponding to the second member set to which the second user belongs.

In this way, at least one message may be sent based on one second packet when the messages are forwarded one by one to the user in the group.

According to the first aspect or any one of the possible implementations of the first aspect, in a fifth possible implementation of the message processing method, the method further includes: for any first message in the message list, generating a message identifier corresponding to the first message, where the second packet further includes the message identifier corresponding to the first message.

In this way, at least one message may be sent based on one second packet when the messages are forwarded one by one to the user who is both the single member and the user in the group.

According to a second aspect, an embodiment of this application provides a message processing method. The method is applied to a first client, and the method includes: generating a first packet in response to an operation of forwarding at least one first message one by one, where the first packet includes a receiving object identifier set and a message list, the receiving object identifier set includes an identifier of at least one receiving object, and the message list includes the at least one first message; and sending the first packet to a server, to enable the server to forward the at least one first message to the at least one receiving object.

In this embodiment of this application, when messages are forwarded one by one, the messages are merged, to reduce a quantity of packets uploaded by a client, reduce a quantity of times of interaction between the client and the server, and further reduce client traffic consumption.

According to the second aspect, in a first possible implementation of the message processing method, the at least one receiving object includes a member and/or a group, and the receiving object identifier set includes a member identifier set and/or a group identifier set. The member identifier set includes a member identifier of each member in the at least one receiving object, and the group identifier set includes a group identifier of each group in the at least one receiving object.

In this way, the client traffic consumption can be reduced in a scenario in which the messages are forwarded one by one to a user who is a single member, the messages are forwarded one by one to a user who is in a group, or the messages are forwarded one by one to a user who is both a single member and a user in a group.

According to a third aspect, an embodiment of this application provides a message processing method. The method is applied to a second client, and the method includes: receiving a second packet sent by a server, where the second packet includes an identifier of at least one receiving object and a message list, the message list includes at least one first message, and the identifier of the at least one receiving object includes a member identifier and/or a group identifier; and displaying the at least one first message one by one based on the identifier of the at least one receiving object.

In this embodiment of this application, when messages are forwarded one by one, the messages are merged, to reduce a quantity of packets downloaded by a client, reduce a quantity of times of interaction between the client and the server, and further reduce client traffic consumption.

According to the third aspect, in a first possible implementation of the message processing method, the displaying the at least one first message one by one based on the identifier of the at least one receiving object includes: when the identifier of the at least one receiving object includes the member identifier, displaying the at least one first message one by one on a session interface with a first user providing the first message.

In this way, a user as a single member can view the at least one first message.

According to the third aspect or the first possible implementation of the third aspect, in a second possible implementation of the message processing method, the displaying the at least one first message one by one based on the identifier of the at least one receiving object includes: when the identifier of the at least one receiving object includes the group identifier, displaying the at least one first message one by one on a session interface of a group corresponding to the included group identifier.

In this way, a user in a group can view the at least one first message.

According to the third aspect or any one of the possible implementations of the third aspect, in a third possible implementation of the message processing method, the displaying the at least one first message one by one based on the identifier of the at least one receiving object includes: when the identifier of the at least one receiving object includes both the member identifier and the group identifier, displaying the at least one first message one by one on the session interface with the first user providing the first message and on the session interface of the group corresponding to the included group identifier.

In this way, a user who is both the single member and the user in the group can view the at least one first message.

According to a fourth aspect, an embodiment of this application provides a message processing apparatus. The apparatus may be used in a server, and the apparatus includes:
a receiving module, configured to receive a first packet sent by a first client, where the first packet includes a receiving object identifier set and a message list, the receiving object identifier set includes an identifier of at least one receiving object, and the message list includes at least one first message;
a determining module, configured to determine, based on the receiving object identifier set in the first packet received by the receiving module, at least one second user that receives the at least one first message; and
a sending module, configured to: for any second user of the at least one second user determined by the determining module, generate a second packet, and send the second packet to a second client to which the second user logs in, where the second packet includes an identifier of a receiving object corresponding to the second user and the message list.

According to the fourth aspect, in a first possible implementation of the message processing apparatus, the at least one receiving object includes a member and/or a group, and the receiving object identifier set includes a member identifier set and/or a group identifier set. The member identifier set includes a member identifier of each member in the at least one receiving object, and the group identifier set includes a group identifier of each group in the at least one receiving object.

The determining module is specifically configured to:
for a member identifier set in the receiving object identifier set, determine a first member set based on a member identifier in the member identifier set; for a group identifier set in the receiving object identifier set, determine at least one first group based on a group identifier in the group identifier set, and determine at least one second member set based on a member identifier of each member included in the at least one first group; and merge the first member set and the at least one second member set to obtain the at least one second user.

According to the first possible implementation of the fourth aspect, in a second possible implementation of the message processing apparatus, in a second packet generated for a second user that belongs to the first member set, the identifier of the receiving object corresponding to the second user includes a member identifier corresponding to the second user.

According to the first possible implementation of the fourth aspect, in a third possible implementation of the message processing apparatus, in a second packet generated for a second user that belongs to the at least one second member set, the identifier of the receiving object corresponding to the second user includes a group identifier corresponding to a second member set to which the second user belongs.

According to the first possible implementation of the fourth aspect, in a fourth possible implementation of the message processing apparatus, in a second packet generated for a second user that belongs to both the first member set and the at least one second member set, the identifier of the receiving object corresponding to the second user includes a member identifier corresponding to the second user and a group identifier corresponding to the second member set to which the second user belongs.

According to the fourth aspect or any one of the possible implementations of the fourth aspect, in a fifth possible implementation of the message processing apparatus, the apparatus further includes:

a generation module, configured to generate, for any first message in the message list, a message identifier corresponding to the first message, where the second packet further includes the message identifier corresponding to the first message.

According to a fifth aspect, an embodiment of this application provides a message processing apparatus. The apparatus may be used in a first client, and the apparatus includes:

a generation module, configured to generate a first packet in response to an operation of forwarding at least one first message one by one, where the first packet includes a receiving object identifier set and a message list, the receiving object identifier set includes an identifier of at least one receiving object, and the message list includes the at least one first message; and a sending module, configured to send the first packet generated by the generation module to a server, to enable the server to forward the at least one first message to the at least one receiving object.

According to the fifth aspect, in a first possible implementation of the message processing apparatus, the at least one receiving object includes a member and/or a group, and the receiving object identifier set includes a member identifier set and/or a group identifier set. The member identifier set includes a member identifier of each member in the at least one receiving object, and the group identifier set includes a group identifier of each group in the at least one receiving object.

According to a sixth aspect, an embodiment of this application provides a message processing apparatus. The apparatus may be used in a second client, and the apparatus includes:

a receiving module, configured to receive a second packet sent by a server, where the second packet includes an identifier of at least one receiving object and a message list, the message list includes at least one first message, and the identifier of the at least one receiving object includes a member identifier and/or a group identifier; and a display module, configured to display, based on the identifier of the at least one receiving object in the second packet received by the receiving module, the at least one first message in the second packet received by the receiving module one by one.

According to the sixth aspect, in a first possible implementation of the message processing apparatus, the display module is specifically configured to:

when the identifier of the at least one receiving object includes the member identifier, display the at least one first message one by one on a session interface with a first user providing the first message.

According to the sixth aspect or the first possible implementation of the sixth aspect, in a second possible implementation of the message processing apparatus, the display module is specifically configured to:

when the identifier of the at least one receiving object includes the group identifier, display the at least one first message one by one on a session interface of a group corresponding to the included group identifier.

According to the sixth aspect or any one of the possible implementations of the sixth aspect, in a third possible implementation of the message processing apparatus, the display module is specifically configured to:

when the identifier of the at least one receiving object includes both the member identifier and the group identifier, display the at least one first message one by one on the session interface with the first user providing the first message and on the session interface of the group corresponding to the included group identifier.

According to a seventh aspect, an embodiment of this application provides an electronic device. The electronic device can implement the message processing method according to one or more of the first aspect or the plurality of possible implementations of the first aspect, the message processing method according to one or more of the second aspect or the plurality of possible implementations of the second aspect, or the message processing method according to one or more of the third aspect or the plurality of possible implementations of the third aspect.

According to an eighth aspect, an embodiment of this application provides a computer program product, including computer-readable code or a non-volatile computer-readable storage medium carrying computer-readable code. When the computer-readable code is run in a processor of an electronic device, the electronic device implements the message processing method according to one or more of the first aspect or the plurality of possible implementations of the first aspect, the message processing method according to one or more of the second aspect or the plurality of possible implementations of the second aspect, or the message processing method according to one or more of the third aspect or the plurality of possible implementations of the third aspect.

These aspects and other aspects of this application are more concise and more comprehensive in descriptions of the following (a plurality of) embodiments.

BRIEF DESCRIPTION OF THE DRAWINGS

The accompanying drawings included in this specification and constituting a part of this specification and this specification jointly show example embodiments, features, and aspects of this application, and are intended to explain principles of this application.

FIG. 3b is a schematic diagram of a format of a binary protocol packet;

FIG. 7a-1 and FIG. 7a-2 are a schematic diagram of an example of interaction between a first client and a server;

DETAILED DESCRIPTION OF ILLUSTRATIVE EMBODIMENTS

Figure 1:
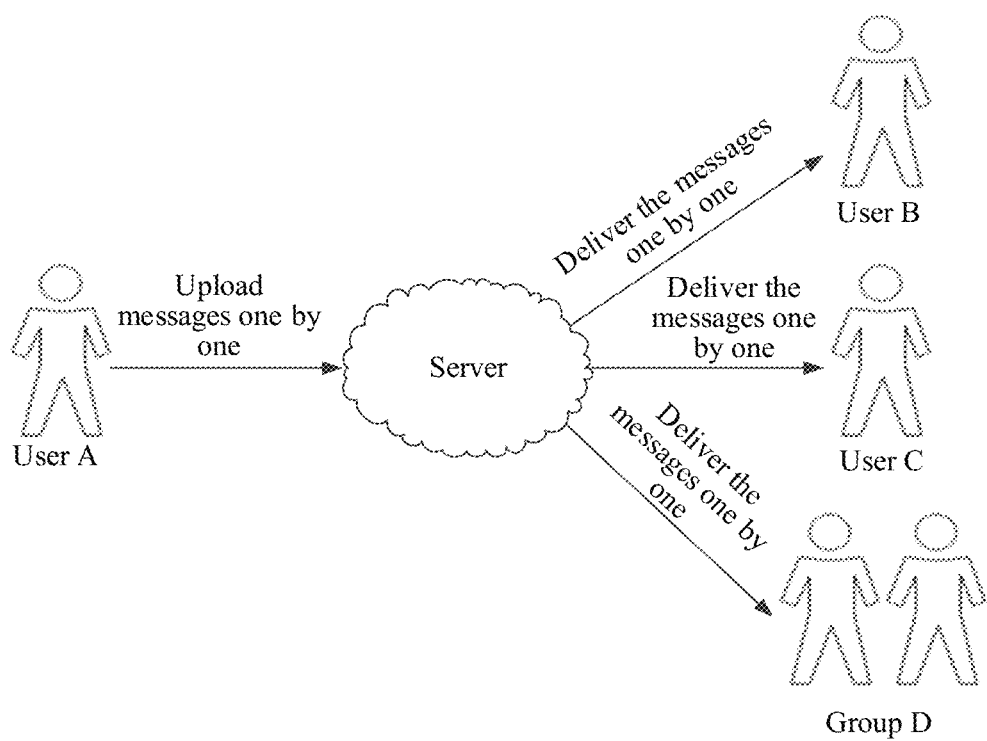
FIG. 1 is a schematic diagram of an application scenario according to an embodiment of this application.

The following describes various example embodiments, features, and aspects of this application in detail with reference to the accompanying drawings. Identical reference numerals in the accompanying drawings indicate elements that have same or similar functions. Although various aspects of embodiments are illustrated in the accompanying drawings, the accompanying drawings are not necessarily drawn in proportion unless otherwise specified.

The specific term "example" herein means "used as an example, embodiment, or illustration". Any embodiment described as "exemplary" is not necessarily explained as being superior or better than other embodiments.

In addition, to better describe this application, numerous specific details are given in the following specific implementations. A person skilled in the art should understand that this application can also be implemented without some specific details. In some instances, methods, means, elements, and circuits that are well-known to a person skilled in the art are not described in detail, so that the subject matter of this application is highlighted.

FIG. 1 is a schematic diagram of an application scenario according to an embodiment of this application. As shown in FIG. 1, when user A forwards messages one by one to user B, user C, group D, and the like, after selecting to-be-forwarded messages, user A first uploads the to-be-forwarded messages to a server one by one. Then, the server delivers received messages to user B, user C, group D, and the like one by one.

Figure 2:
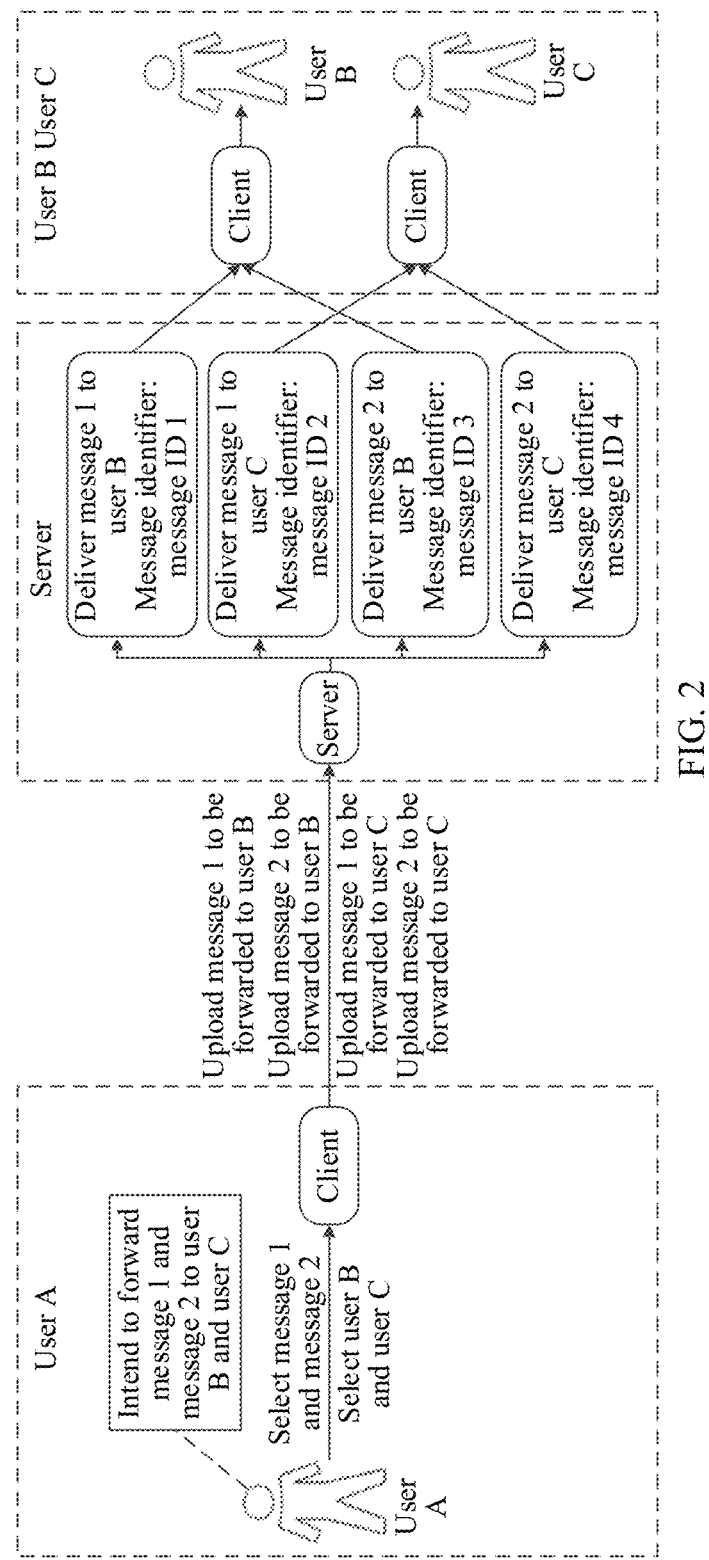
FIG. 2 is a schematic diagram of a process of forwarding messages one by one in a related technology.

In a related technology, when messages are forwarded one by one, complete forwarding processing needs to be performed on each to-be-forwarded message. The following describes a process in which user A forwards message 1 and message 2 one by one to user B and user C in the related technology with reference to FIG. 2. FIG. 2 is a schematic diagram of a process of forwarding messages one by one in a related technology. As shown in FIG. 2, when user A wants to forward message 1 and message 2 to user B and user C, user A selects message 1 and message 2 as to-be-forwarded messages on a client to which user A logs in, and selects user B and user C as users receiving message 1 and message 2. Based on this, the client to which user A logs in separately uploads message 1 forwarded to user B, message 2 forwarded to user B, message 1 forwarded to user C, and message 2 forwarded to user C to a server. During this process, the client to which user A logs in performs four times of interaction (which can also be referred to as four times of device-cloud call) with the server, and the client to which user A logs in uploads four packets to the server. The server generates a new message identifier for each received message. Specifically, the server generates a message identifier "message ID 1" for message 1 forwarded to user B, a message identifier "message ID 2" for message 1 forwarded to user C, a message identifier "message ID 3" for message 2 forwarded to user B, and a message identifier "message ID 4" for message 2 forwarded to user C. Then, the server separately delivers message 1 whose message identifier is "message ID 1" and message 2 whose message identifier is "message ID 3" to a client to which user B logs in, and separately delivers message 1 whose message identifier is "message ID 2" and message 2 whose message identifier is "message ID 4" to a client to which user C logs in. During this process, the server performs two times of interaction with the client to which user B logs in and delivers two packets to the client to which user B logs in. The server performs two times of interaction with the client to which user C logs in and delivers two packets to the client to which user C logs in. Then, user B may receive two packets, one packet carries message 1 whose message identifier is "message ID 1", and the other packet carries message 2 whose message identifier is "message ID 3". User C may receive two packets, one packet carries message 1 whose message identifier is "message ID 2", and the other packet carries message 2 whose message identifier is "message ID 4".

It can be learned from the process that, although user A selects only two messages to be forwarded to user B and user C, the client to which user A logs in uploads four packets, user B and user C download four packets in total, and the client performs eight times of interaction (including four times of uploading and four times of delivery) with the server. It can be learned that, in the related technology, when messages are forwarded one by one, problems such as a large quantity of packets uploaded by a user who uploads a message, a large quantity of packets downloaded by a user who receives a message, and a large quantity of times of interaction between the client and the server exist, resulting in high client traffic consumption. In addition, as a quantity of to-be-forwarded messages increases, the quantity of times of interaction between the client and the server increases greatly, and client traffic consumption also increases greatly. For example, based on FIG. 2, if the quantity of to-be-forwarded messages is 3, the quantity of times of interaction between the client and the server is 12 (including six times of uploading and six times of delivery). If the quantity of to-be-forwarded messages is 4, the quantity of times of interaction between the client and the server is 16 (including eight times of uploading and eight times of delivery). If the quantity of to-be-forwarded messages is 6, the quantity of times of interaction between the client and the server is 24 (including 12 times of uploading and 12 times of delivery).

This embodiment of this application provides a message processing method. When messages are forwarded one by one, the messages are merged, to reduce a quantity of packets uploaded by the client and a quantity of packets delivered by the server, reduce the quantity of times of interaction between the client and the server, and further reduce the client traffic consumption.

Figure 3A:
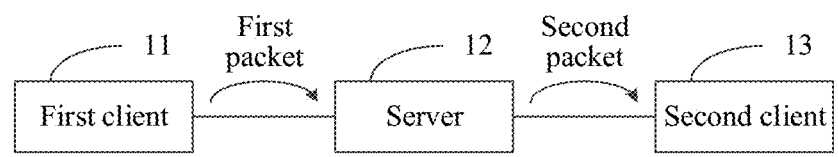
FIG. 3a is a schematic diagram of a structure of a message processing system according to an embodiment of this application.

FIG. 3a is a schematic diagram of a structure of a message processing system according to an embodiment of this application. As shown in FIG. 3a, the message processing system may include a first client 11, a server 12, and a second client 13. The first client indicates a client to which a user who sends a first message logs in, for example, the client to which user A logs in shown in FIG. 2. The second client 13 indicates a client to which a user who receives the first message logs in, for example, the clients to which user B and user C log in shown in FIG. 2. The first client 11 may forward the first message to the second client 13 through the server 12.

In this embodiment of this application, the first message may indicate a to-be-forwarded message. The first message may be any message, and there may be one or more first messages. The first message may include one or more of a text, a symbol, a voice, a video, a picture, and a link. For example, the first message may be a short message, an instant messaging message, a comment, a bullet comment, or the like. The user who sends the first message may be referred to as a first user. The user who receives the first message may be referred to as a second user. There may be one or more second users. In a possible implementation, the second user may be a single member and/or a member in a group. For example, the second user may be any member of user B, user C, or group D shown in FIG. 1.

To reduce a quantity of times of interaction between a client and a server, and reduce client traffic consumption, in this embodiment of this application, when uploading at least one first message, the first client 11 may merge all first messages forwarded to different users into one first packet for uploading. When delivering the first message, the server 12 may merge all first messages forwarded to a same user into one second packet for delivering. In this way, one time of interaction between the first client 11 and the server 12 may implement uploading of a plurality of first messages of a plurality of users, and one time of interaction between the server 12 and the second client 13 may implement delivery of a plurality of first messages of a single user, so that the quantity of times of interaction between the client and the server is effectively reduced, and the client traffic consumption is reduced. For example, assuming that a quantity of the second users is 2, if a quantity of the first messages is 2, the quantity of times of interaction between the client and the server is 3 (including one time of uploading and two times of delivery). If the quantity of the first messages is 4, the quantity of times of interaction between the client and the server is still 3 (including one time of uploading and two times of delivery). If the quantity of the first messages is 8, the quantity of times of interaction between the client and the server is still 3 (including one time of uploading and two times of delivery). It can be learned that, in this embodiment of this application, the quantity of times of interaction between the client and the server is related to the quantity of the second users, and does not increase with a quantity of to-be-forwarded first messages. This effectively reduces the client traffic consumption.

In this embodiment of this application, the first packet and the second packet may be binary protocol packets. A binary protocol packet has the following features: low traffic consumption, simple interaction process, and easy expansion, which can further reduce the client traffic consumption. The following describes a format of a binary protocol packet in this application.

FIG. 3b is a schematic diagram of a format of a binary protocol packet. As shown in FIG. 3b, in this embodiment of this application, a transmission control protocol (Transmission Control Protocol, TCP) header may be added before the binary protocol packet, to implement a TCP-based bearer. Certainly, in an implementation, another protocol may alternatively be used to carry the binary protocol packet. This is not limited in this application.

As shown in FIG. 3b, the binary protocol packet includes a protocol header, a service header, and service data. The protocol header includes the following fields: a total length field, a version number field, a service type field, a control field, and a trace identification number field. The total length field occupies 2 bytes, and indicates a total length of a part of the protocol header (a start part of a version number), the service header, and the service data. The version number field occupies 2 bytes, and indicates a current protocol type. The service type field occupies 1 byte. A service type may include call signaling, message signaling, and the like. The control field occupies 1 byte, and each bit of the control field may perform a kind of control, for example, compression and fragmentation. The trace identification number occupies 8 bytes, traces a packet of a client and a server, and locates a problem. The service header includes the following fields: a sub-message type field, a service header length field, and a field of a service header of the sub-message type. A sub-message type occupies two bytes. The sub-message type includes message sending, message synchronization, one-by-one forwarding, and merged forwarding. A length of a service header corresponding to the sub-message type occupies 2 bytes, and indicates metadata corresponding to each sub-message type. The service header of the sub-message type is variable-length data, is serialized and deserialized by protocol sorting (Protocol buffer, Probuffer), and supports forward compatibility, and includes a receiving object identifier set. The receiving object identifier set includes an identifier of at least one receiving object. For example, the receiving object includes a member and/or a group, and the receiving object identifier set includes a member identifier set and/or a group identifier set. The member identifier set includes a member identifier of each member in the receiving object, and the group identifier set includes a group identifier of each group in the receiving object. In an implementation, the service header of the sub-message type may include <member, member identifier set> and/or <group, group identifier set>. The service data part includes a service data field of the sub-message type. The field is variable-length data, may be serialized and deserialized by using the Probuffer, and supports forward compatibility, which includes a message list, and the message list includes at least one first message.

It should be noted that the identifier of the receiving object identifies a unique receiving object, the member identifier identifies a unique member, and the group identifier identifies a unique group. The identifier, the member identifier, and the group identifier of the receiving object may be a number, an identify code, a user name, a group name, or the like. This is not limited in this application. The first packet and the second packet may alternatively be other protocol packets. This is not limited in this application.

In an implementation of this application, a party that initiates data forwarding and sends data to the server may be referred to as a source (source) end (for example, the first client 11 shown in FIG. 3a), and a party that receives the data may be referred to a sink (sink) end (for example, the second client 13 shown in FIG. 3a). It should be noted that, in a pairing relationship, a device that serves as a source end may alternatively serve as a sink end in another scenario. To be specific, for one terminal device, the terminal device may serve as a source end of another terminal device, or may serve as a sink end of another terminal device.

The terminal device (including a device that deploys the source end and a device that deploys the sink end) in this application may be a device having a wireless connection function. The wireless connection function means that the device may be connected to another terminal device in a wireless connection manner such as wireless fidelity (wireless fidelity, Wi-Fi) or Bluetooth. The terminal device in this application may alternatively have a function of performing communication through a wired connection. The terminal device in this application may be a touchscreen device, may be a non-touchscreen device, or may be a device without a screen. If the device is the touchscreen device, the terminal device may be controlled by tapping or sliding on a display screen by using a finger, a stylus, or the like. The non-touchscreen device may be connected to an input device such as a mouse, a keyboard, and a touch panel, and the terminal device may be controlled by using the input device. The device without a screen may be, for example, a Bluetooth speaker without a screen.

For example, the terminal device in this application may be a smartphone, a netbook, a tablet computer, a notebook computer, a wearable electronic device (for example, a smart band or a smart watch), a virtual reality device, a speaker, or the like.

Figure 4:
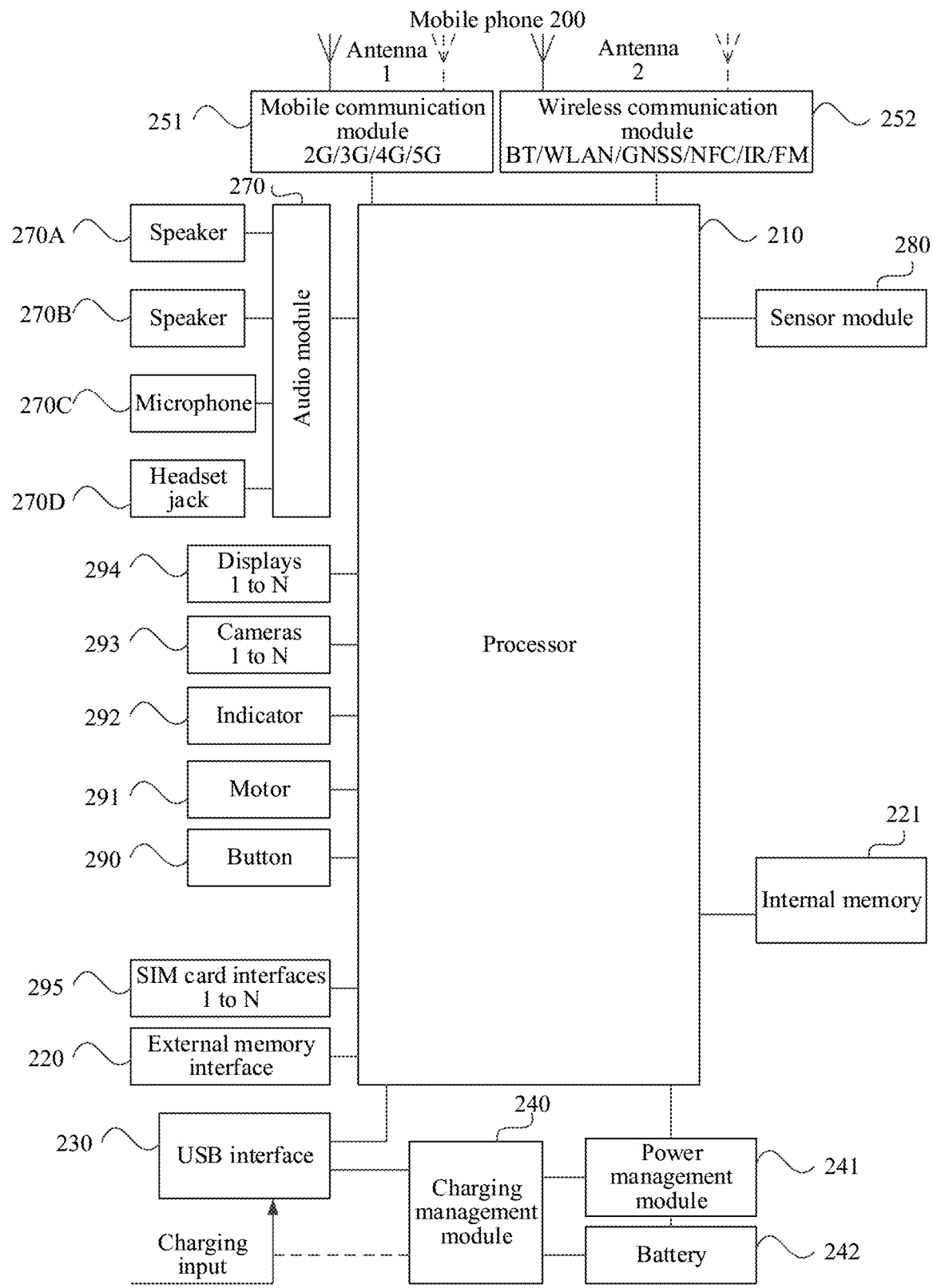
FIG. 4 is a schematic diagram of a structure of a terminal device according to an embodiment of this application.

FIG. 4 is a schematic diagram of a structure of a terminal device according to an embodiment of this application. For example, the terminal device is a mobile phone. FIG. 4 is a schematic diagram of a structure of a mobile phone 200.

The mobile phone 200 may include a processor 210, an external memory interface 220, an internal memory 221, a USB interface 230, a charging management module 240, a power management module 241, a battery 242, an antenna 1, an antenna 2, a mobile communication module 251, a wireless communication module 252, an audio module 270, a speaker 270A, a receiver 270B, a microphone 270C, a headset jack 270D, a sensor module 280, a button 290, a motor 291, an indicator 292, a camera 293, a display 294, a SIM card interface 295, and the like. The sensor module 280 may include a gyroscope sensor, an acceleration sensor, an optical proximity sensor, a fingerprint sensor, a touch sensor, a temperature sensor, a pressure sensor, a distance sensor, a magnetic sensor, an ambient optical sensor, a barometric pressure sensor, a bone conduction sensor, or the like (which is not shown in the figure).

It may be understood that the structure shown in this embodiment of this application does not constitute a specific limitation on the mobile phone 200. In some other embodiments of this application, the mobile phone 200 may include more or fewer components than those shown in the figure, combine some components, split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU). Different processing units may be independent components, or may be integrated into one or more processors. The controller may be a nerve center and a command center of the mobile phone 200. The controller may generate an operation control signal based on instruction operation code and a time sequence signal, to complete control of instruction reading and instruction execution.

A memory may be further disposed in the processor 210, and is configured to store instructions and data. In some embodiments, the memory in the processor 210 is a cache memory. The memory may store instructions or data just used or cyclically used by the processor 210. If the processor 210 needs to use the instructions or the data again, the processor may directly invoke the instructions or the data from the memory. This avoids repeated access, reduces waiting time of the processor 210, and improves system efficiency.

The processor 210 may run the message processing method provided in this embodiment of this application, to reduce client traffic consumption. The processor 210 may include different components. For example, when a CPU and a GPU are integrated, the CPU and the GPU may cooperate to perform the message processing method provided in this embodiment of this application. For example, in the message processing method, some algorithms are executed by the CPU, and other algorithms are executed by the GPU, to obtain high processing efficiency.

The display 294 is configured to display an image, a video, or the like. The display 294 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diodes, QLED), or the like. In some embodiments, the mobile phone 200 may include one or N displays 294, where N is a positive integer greater than 1. The display 294 may be configured to display information input by a user or information provided to a user, and various graphical user interfaces (graphical user interfaces, GUIs). For example, the display 294 may display a photo, a video, a web page, a file, or the like. For another example, the display 294 may display a graphical user interface. The graphical user interface may include a status bar, a hidden navigation bar, a time and weather widget (widget), and an application icon, for example, a browser icon. The status bar includes an operator name (for example, China Mobile), a mobile network (for example, 4G), time, and remaining power. The navigation bar includes a back (back) button icon, a home (home) button icon, and a forward button icon. In addition, it may be understood that, in some embodiments, the status bar may further include a Bluetooth icon, a Wi-Fi icon, an externally-connected device icon, and the like. It may be further understood that, in some other embodiments, the graphical user interface may further include a Dock bar, and the Dock bar may include an icon of a frequently-used application and the like. After detecting a touch event of a finger (which may be a stylus, or the like) of a user for an application icon, the processor 210 opens, in response to the touch event, a user interface of an application corresponding to the application icon, and displays the user interface of the application on the display 294.

In this embodiment of this application, the display 294 may be one integrated flexible display, or may be a spliced display including two rigid screens and one flexible screen located between the two rigid screens.

After the processor 210 runs the message processing method provided in this embodiment of this application, the terminal device may establish a connection to another electronic device through the antenna 1, the antenna 2, or a USB interface, transmit data according to the message processing method provided in this embodiment of this application, and control the display 294 to display a corresponding graphical user interface. In this embodiment of this application, data such as the first packet and the second packet may be transmitted, and the display 294 may be controlled to display a graphical user interface such as a session interface, a one-by-one forwarding interface, and a session list.

The camera 293 (which may be a front-facing camera, a rear-facing camera, or a camera that may serve as both a front-facing camera and a rear-facing camera) is configured to capture a static image or a video. Generally, the camera 293 may include a photosensitive element such as a lens group and an image sensor. The lens group includes a plurality of lenses (convex lenses or concave lenses), and is configured to: collect an optical signal reflected by a to-be-photographed object, and transfer the collected optical signal to the image sensor. The image sensor generates an original image of the to-be-photographed object based on the optical signal.

The internal memory 221 may be configured to store computer-executable program code, and the executable program code includes instructions. The processor 210 runs the instructions stored in the internal memory 221, to implement various function applications and data processing of the mobile phone 200. The internal memory 221 may include a program storage area and a data storage area. The program storage area may store code of an operating system, an application (for example, a camera application or a WeChat application), and the like. The data storage area may store data (for example, an image or a video captured by the camera application) created during use of the mobile phone 200, and the like.

The internal memory 221 may further store one or more computer programs 1310 corresponding to the message processing method provided in this embodiment of this application. The one or more computer programs 1304 are stored in the memory 221 and are configured to be executed by the one or more processors 210. The one or more computer programs 1310 include instructions.

In addition, the internal memory 221 may include a high speed random access memory, and may further include a non-volatile memory, for example, at least one magnetic disk storage component, a flash memory component, or a universal flash storage (universal flash storage, UFS).

Certainly, code of a data processing method provided in this embodiment of this application may alternatively be stored in an external memory. In this case, the processor 210 may run, through the external memory interface 220, code of the data processing method stored in the external memory.

The following describes a touch sensor 280K, which is also referred to as a "touch panel". The touch sensor 280K may be disposed on the display 294. The touch sensor 280K and the display 294 constitute a touchscreen, which is also referred to as a "touchscreen". The touch sensor 280K is configured to detect a touch operation performed on or near the touch sensor 280K. The touch sensor may transfer the detected touch operation to the application processor, to determine a type of a touch event. A visual output related to the touch operation may be provided through the display 294. In some other embodiments, the touch sensor 280K may alternatively be disposed on a surface of the mobile phone 200 and is located at a location different from that of the display 294.

For example, the display 294 of the mobile phone 200 displays a home screen, and the home screen includes icons of a plurality of applications (for example, the camera application and the WeChat application). A user taps the icon of the camera application on the home screen by using the touch sensor 280K, to trigger the processor 210 to enable the camera application and turn on the camera 293. The display 294 displays an interface of the camera application, for example, a viewfinder interface.

A wireless communication function of the mobile phone 200 may be implemented through the antenna 1, the antenna 2, the mobile communication module 251, the wireless communication module 252, the modem processor, the baseband processor, and the like.

The antenna 1 and the antenna 2 are configured to transmit and receive electromagnetic wave signals. Each antenna in the mobile phone 200 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 251 may provide a solution that is applied to the mobile phone 200 and that includes wireless communication such as 2G, 3G, 4G, and 5G. The mobile communication module 251 may include at least one filter, a switch, a power amplifier, a low noise amplifier (low noise amplifier, LNA), and the like. The mobile communication module 251 may receive an electromagnetic wave through the antenna 1, perform processing such as filtering or amplification on the received electromagnetic wave, and transmit the electromagnetic wave to the modem processor for demodulation. The mobile communication module 251 may further amplify a signal modulated by the modem processor, and convert the signal into an electromagnetic wave for radiation through the antenna 1. In some embodiments, at least some functional modules of the mobile communication module 251 may be disposed in the processor 210. In some embodiments, at least some functional modules of the mobile communication module 251 may be disposed in a same component with at least some modules of the processor 210. In this embodiment of this application, the mobile communication module 251 may be further configured to exchange information with another electronic device, for example, send the first packet to the server and receive the second packet from the server.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 270A, the receiver 270B, or the like), or displays an image or a video through the display 294. In some embodiments, the modem processor may be an independent component. In some other embodiments, the modem processor may be independent of the processor 210, and is disposed in a same component with the mobile communication module 251 or another functional module.

The wireless communication module 252 may provide a solution that is applied to the mobile phone 200 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communication module 252 may be one or more components integrating at least one communication processing module. The wireless communication module 252 receives an electromagnetic wave through the antenna 2, performs frequency modulation and filtering processing on an electromagnetic wave signal, and sends the processed signal to the processor 210. The wireless communication module 252 may further receive a to-be-sent signal from the processor 210, perform frequency modulation and amplification on the signal, and convert the signal into an electromagnetic wave for radiation through the antenna 2. In this embodiment of this application, the wireless communication module 252 is configured to transmit data with another electronic device under control of the processor 210. For example, when the processor 210 runs the message processing method provided in this embodiment of this application, the processor may control the wireless communication module 252 to send the first packet to the server.

In addition, the mobile phone 200 may implement an audio function such as music playing and recording by using the audio module 270, the speaker 270A, the receiver 270B, the microphone 270C, the headset jack 270D, the application processor, and the like. The mobile phone 200 may receive an input from the button 290, and generate a button signal input related to a user setting and function control of the mobile phone 200. The mobile phone 200 may generate a vibration prompt (for example, an incoming call vibration prompt) by using the motor 291. The indicator 292 in the mobile phone 200 may be an indicator light, may be configured to indicate a charging status and a power change, or may be configured to indicate a message, a missed call, a notification, and the like. The SIM card interface 295 in the mobile phone 200 is configured to connect to a SIM card. The SIM card may be inserted into the SIM card interface 295 or removed from the SIM card interface 295, to implement contact with or separation from the mobile phone 200.

It should be understood that during actual application, the mobile phone 200 may include more or fewer components than those shown in FIG. 4. This is not limited in this embodiment of this application. The mobile phone 200 shown in the figure is merely an example, and the mobile phone 200 may have more or fewer components than those shown in the figure, may combine two or more components, or may have different component configurations. The components shown in the figure may be implemented in hardware, software, or a combination of hardware and software that includes one or more signal processing and/or application-specific integrated circuits.

Figure 5:
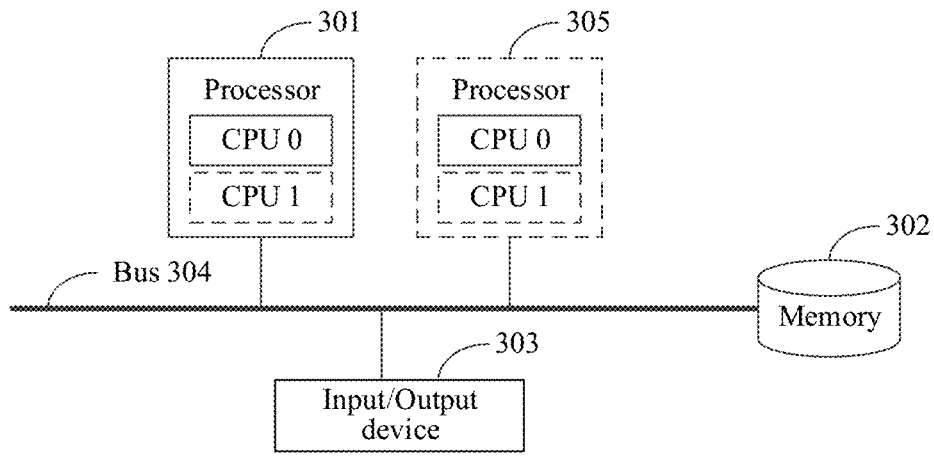
FIG. 5 is a schematic diagram of a structure of an electronic device for deploying a server according to an embodiment of this application.

The server in this application may be deployed on a virtual machine (Virtual Machine, VM) or a container on a cloud (public cloud or private cloud). The cloud may be a cluster including a plurality of electronic devices. FIG. 5 is a schematic diagram of a structure of an electronic device for deploying a server according to an embodiment of this application. The server 12 shown in FIG. 3a may be deployed on the electronic device shown in FIG. 5.

As shown in FIG. 5, the electronic device may include at least one processor 301, a memory 302, an input/output device 303, and a bus 304. The following describes the components of the electronic device in detail with reference to FIG. 5.

The processor 301 is a control center of the electronic device, and may be a processor, or may be a collective term of a plurality of processing elements. For example, the processor 301 is a CPU, an application-specific integrated circuit (Application-Specific Integrated Circuit, ASIC), or one or more integrated circuits that are configured to implement this embodiment of this disclosure, for example, one or more microprocessors (Digital Signal Processors, DSPs), or one or more field programmable gate arrays (Field Programmable Gate Arrays, FPGAs).

The processor 301 may execute various functions of the electronic device by running or executing a software program stored in the memory 302 and invoking data stored in the memory 302.

During specific implementation, in an embodiment, the processor 301 may include one or more CPUs, for example, CPU 0 and CPU 1 shown in the figure.

During specific implementation, in an embodiment, the electronic device may include a plurality of processors, for example, the processor 301 and a processor 305 shown in FIG. 5. Each of the processors may be a single-core processor (single-CPU), or may be a multi-core processor (multi-CPU). The processor herein may be one or more devices, circuits, and/or processing cores configured to process data (for example, computer program instructions).

The memory 302 may be a read-only memory (Read-Only Memory, ROM) or another type of static storage device that can store static information and instructions, random access memory (Random Access Memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of instructions or a data structure and that can be accessed by a computer. However, the memory is not limited thereto. The memory 302 may exist independently, and is connected to the processor 301 through the bus 304. Alternatively, the memory 302 may be integrated with the processor 301. In this embodiment of this disclosure, the memory may be configured to store atomic operation description information and a process model.

The input/output device 303 is configured to communicate with another device or a communications network, for example, is configured to communicate with a communication network such as an Ethernet, a radio access network (Radio access network, RAN), and a wireless local area network (Wireless Local Area Network, WLAN). The input/output device 303 may include all or a part of a baseband processor, and may selectively include a wireless radio frequency (Radio Frequency, RF) processor. The RF processor is configured to send or receive an RF signal. The baseband processor is configured to process a baseband signal converted from an RF signal, or a baseband signal to be converted into an RF signal.

During specific implementation, in an embodiment, the input/output device 303 may include a transmitter and a receiver. The transmitter is configured to send a signal to another device or a communication network, and the receiver is configured to receive a signal sent by the another device or the communication network. The transmitter and the receiver may exist independently, or may be integrated together. In this embodiment of this disclosure, the input/output device may be configured to send and receive a first packet and a second packet.

The bus 304 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line indicates the bus in FIG. 5, but this does not mean that there is only one bus or only one type of bus.

A device structure shown in FIG. 5 does not constitute a limitation on the electronic device. The electronic device may include components more or fewer than those shown in the figure, may combine some components, or may have different component arrangements.

Figure 6:
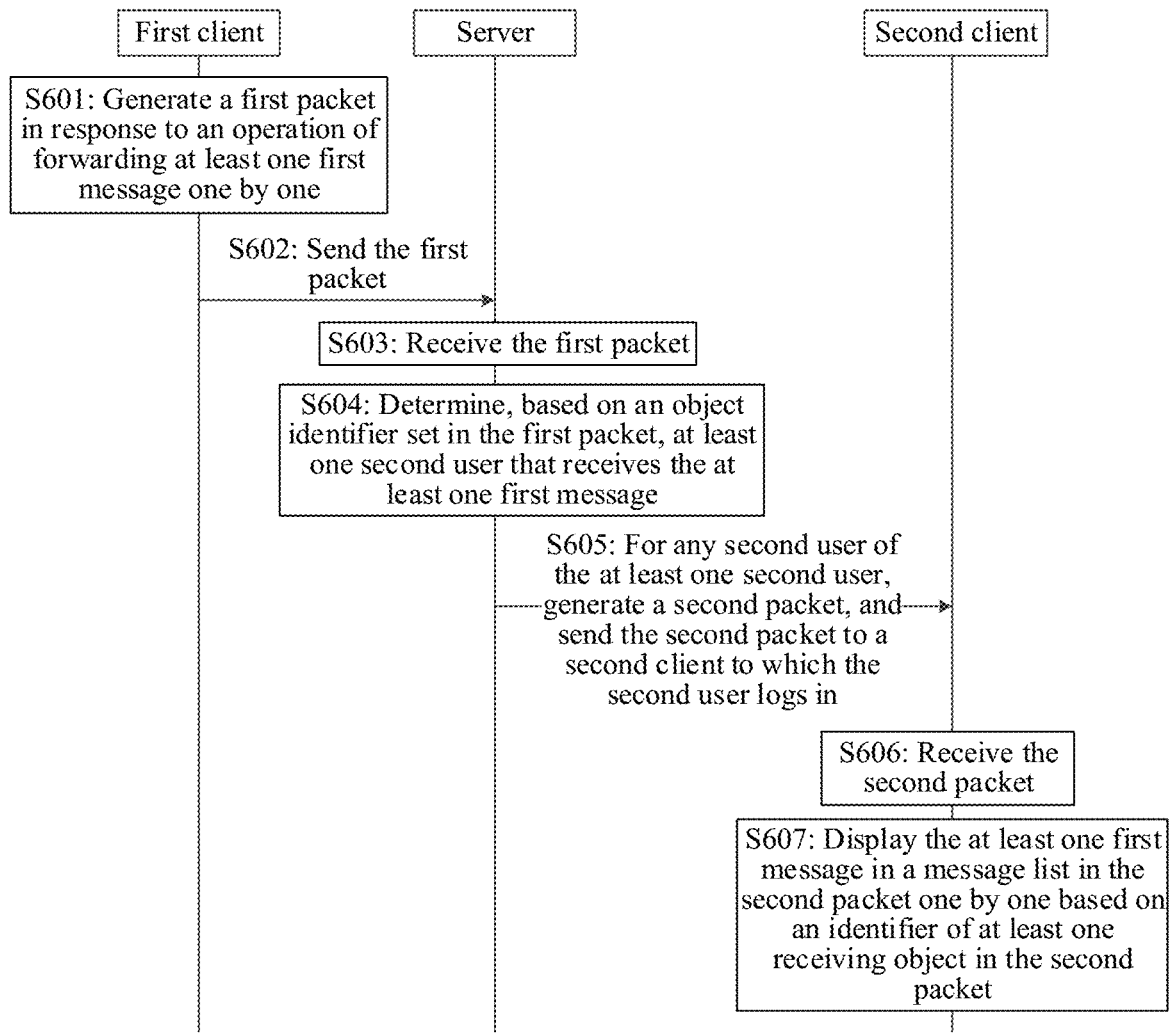
FIG. 6 is an interaction flowchart of a message processing method according to an embodiment of this application.

To reduce client traffic consumption when messages are forwarded one by one, an embodiment of this application provides a message processing method. Receiving objects are merged, to reduce a quantity of times of interaction between a client and a server, and reduce the client traffic consumption. FIG. 6 is an interaction flowchart of a message processing method according to an embodiment of this application. The method may be applied to the system shown in FIG. 3a. As shown in FIG. 6, the method may include the following steps.

Step S601: A first client generates a first packet in response to an operation of forwarding at least one first message one by one.

Step S602: The first client sends the first packet to a server.

The first message may indicate a to-be-forwarded message. There may be one or more first messages. The first message may include one or more of a text, a symbol, a voice, a video, a picture, and a link. A first user may indicate a user that needs to forward the at least one first message. The first client may indicate a client to which the first user logs in, and the first client may be any client owned by the first user.

When the at least one first message needs to be forwarded, the first user may perform, on the first client, an operation of forwarding the at least one first message. The operation of forwarding the at least one first message one by one may include a series of operations of selecting the at least one first message, selecting at least one receiving object, and selecting one-by-one forwarding as a forwarding manner. In other words, the operation of forwarding the at least one first message one by one may be split into the operation of selecting the at least one first message, the operation of selecting the at least one receiving object, and the operation of selecting the forwarding manner. In an implementation, the first user may perform, on a same interface, the operation of selecting the at least one first message, the operation of selecting the at least one receiving object, and the operation of selecting the forwarding manner. Alternatively, the first user may perform the operations on different interfaces. For example, the first user may perform the operation of selecting the at least one first message and the operation of selecting the forwarding manner on a session interface, and perform the operation of selecting the at least one receiving object on a sending interface, or the first user may perform the operation of selecting the at least one first message on a session interface, and perform the operation of selecting the at least one receiving object and an operation of selecting the sending manner on a sending interface. An interface for performing the operations is not limited in this embodiment of this application. In addition, a time sequence of performing the operations is not limited in this embodiment of this application. For example, the first user may first select one or more messages on the first client as the first message, then select one or more members and/or groups as a receiving object of the first message, and finally select the one-by-one forwarding as the forwarding manner of the first message, to implement the operation of forwarding the at least one first message one by one by the first user. For another example, the first user may first select one or more messages on the first client as the first message, then select the one-by-one forwarding as the forwarding manner of the first message, and finally select one or more members and/or groups as a receiving object of the first message, to implement the operation of forwarding the at least one first message one by one by the first user.

The first client may generate the first packet in response to the operation of forwarding the at least one first message one by one by the first user. In an implementation, the first packet may include a receiving object identifier set and a message list. The receiving object identifier set may indicate the receiving object of the first message. Specifically, the receiving object identifier set includes an identifier of the at least one receiving object. The message list may indicate the first message. Specifically, the message list includes the at least one first message.

In a possible implementation, the receiving object includes a member and/or a group. In other words, the first message may be forwarded only to one or more members, may be forwarded only to one or more groups, or may be forwarded to both one or more members and one or more groups. It may be understood that the group may include a plurality of members. Based on this, the receiving object identifier set may include a member identifier set and/or a group identifier set. The member identifier set includes a member identifier of each member in the at least one receiving object. The group identifier set includes a group identifier of each group in the at least one receiving object.

In an implementation, a format of the first packet may be shown in FIG. 3b. One-by-one forwarding may be performed based on a sub-message type field identifier, the receiving object identifier set may be written into a service header of a sub-message type, and the message list may be written into service data of the sub-message type. When the receiving object identifier set is written into the service header of the sub-message type, the identifier of the receiving object in the receiving object identifier set may be separately written into the member identifier set and the group identifier set depending on whether the receiving object is a member or a group. Specifically, in the service header of the sub-message type, a mapping between a member and a member identifier set, and a mapping between a group and a group identifier set may be formed.

Then, the first client may send the generated first packet to the server for forwarding.

Figures 1, 7A:
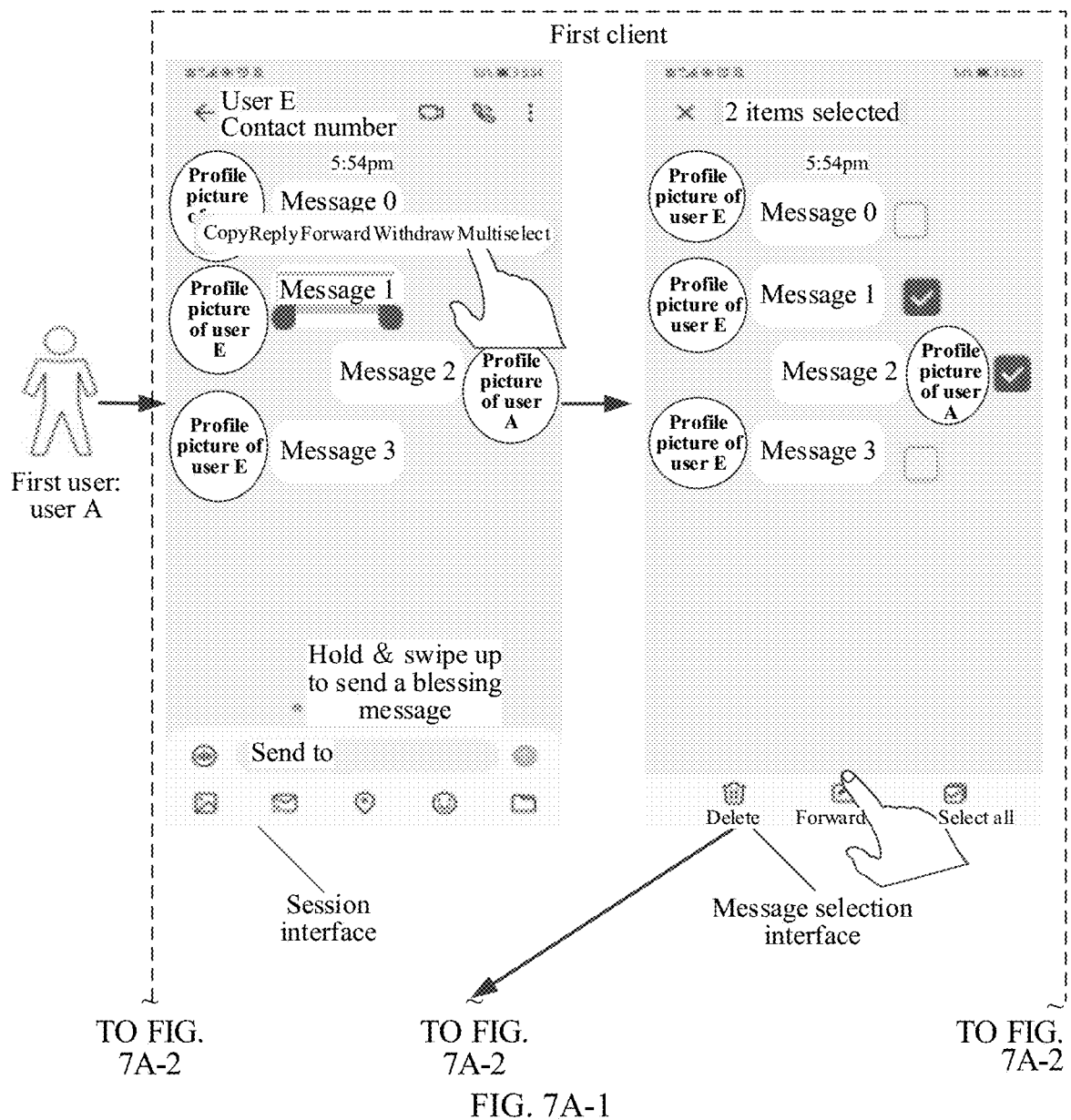
Figures 2, 7A:
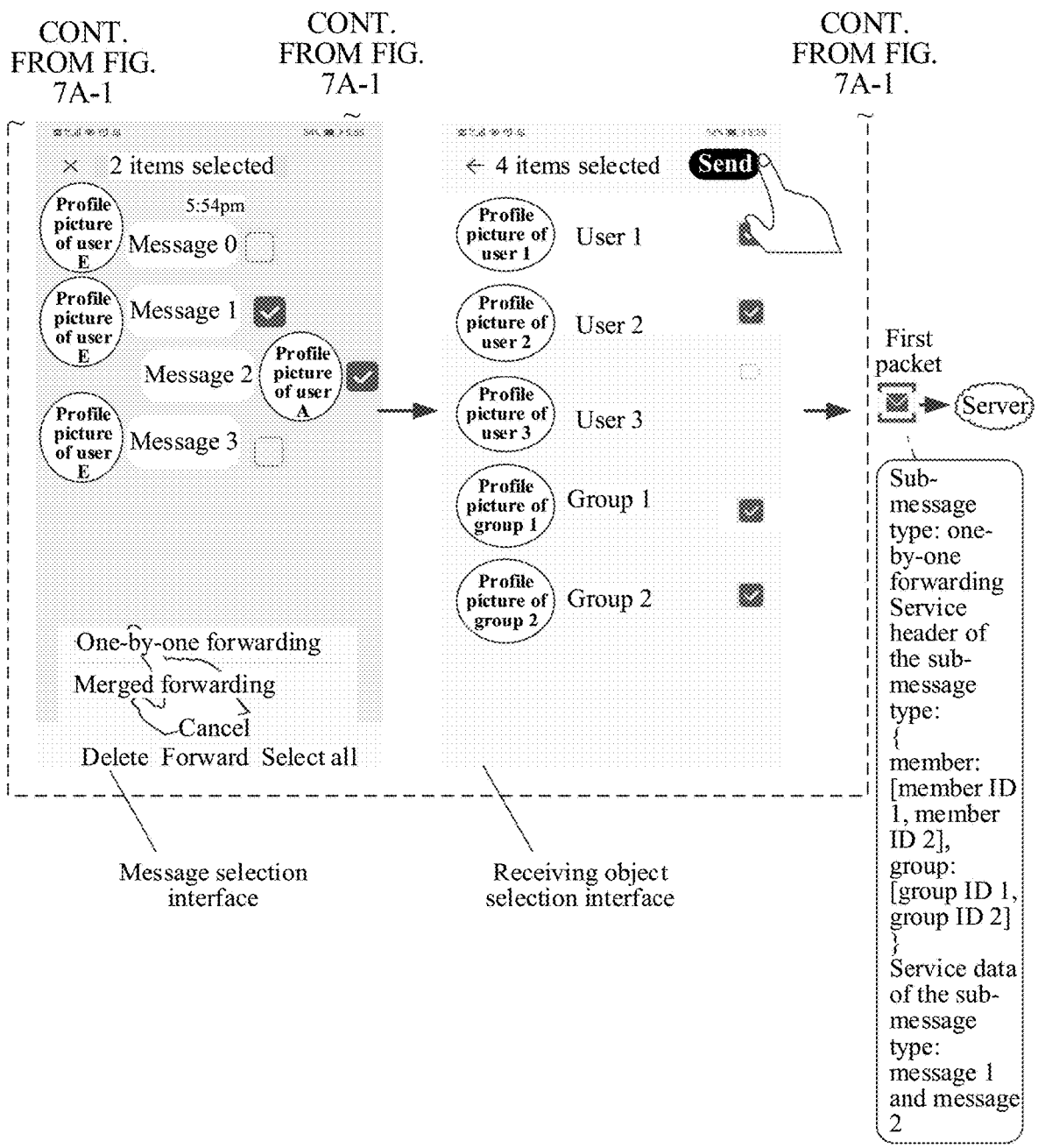

FIG. 7a-1 and FIG. 7a-2 are a schematic diagram of an example of interaction between the first client and the server. As shown in FIG. 7a-1 and FIG. 7a-2, the first client displays a session interface between user A and user E. User A is a user who logs in to the first client, that is, the first user.

As shown in FIG. 7a-1 and FIG. 7a-2, user E sends message 0, message 1, and message 3 to user A, and user A sends message 2 to user E. The first message may be selected from a message sent by a member that conducts a session with the first user and a message sent by the first user. In other words, the first message may be selected from message 0, message 1, message 3, and message 2. The session interface shown in FIG. 7a-1 and FIG. 7a-2 is a member session interface, that is, an interface for the first user to conduct a separate session with a member. In an implementation, the session interface displayed by the first client may alternatively be a group session interface (not shown), that is, a session interface of a group to which the first user belongs. In this case, the first message may be selected from a message sent by any member (including the first user and a user other than the first user in the group) in the group.

The first user may trigger, on the session interface shown in FIG. 7a-1 and FIG. 7a-2, an operation of selecting at least one first message. For example, the first user may long-press any message (for example, message 1 shown in FIG. 7a-1 and FIG. 7a-2) on the session interface. In response to the long-press operation of the first user on the message, the session interface of the first client may display a "Multiselect" control in a pop-up box (as shown in FIG. 7a-1 and FIG. 7a-2, the session interface may further display another control for performing an operation on the message in the pop-up box, for example, a "Copy" control, a "Reply" control, a "Forward" control, and a "Withdraw" control). The first user may tap the "Multiselect" control to forward the at least one first message. As shown in FIG. 7a-1 and FIG. 7a-2, in response to the operation of tapping the "Multiselect" control by the first user, an interface displayed by the first client switches from the session interface to a message selection interface. On the message selection interface, the first client provides one check box (or may provide another control for selection, which is not shown) for each message on the message selection interface (including a part displayed and a part not displayed on a display screen). The first user may select the first message by tapping the check box. The first user may select one or more messages (for example, message 1 and message 2 shown in FIG. 7a-1 and FIG. 7a-2) as a to-be-forwarded first message. After completing message selection, the first user may tap the "Forward" control on the message selection interface. In response to the operation of tapping the "Forward" control by the first user, the message selection interface of the first client displays a "One-by-one forwarding" control in a pop-up window (as shown in FIG. 7a-1 and FIG. 7a-2, the session interface may further display another control of the forwarding manner in the pop-up window, for example, a "Merged forwarding" control and a "Cancel" control). The first user may tap the "One-by-one forwarding" control to select to forward message 1 and message 2 in the one-by-one forwarding manner. In response to the operation of tapping the "One-by-one forwarding" control by the first user, the interface displayed by the first client switches from the message selection interface to a receiving object selection interface. The receiving object selection interface may display one or more optional receiving objects and a check box corresponding to each optional receiving object. The receiving object may include a single member (for example, user 1 and user 2). The receiving object may further include a group (for example, group 1 and group 2). After selecting the receiving object, the first user may tap a "Send" control, to complete triggering the operation of selecting the at least one first message. In response to the operation of tapping the "send" control by the first user, the first client may generate the first packet, and send the first packet to the server.

As shown in FIG. 7a-1 and FIG. 7a-2, the first user selects user 1, user 2, group 1, and group 2 as receiving objects on the receiving object selection interface. A member identifier of user 1 is member ID 1, a member identifier of user 2 is member ID 2, a group identifier of group 1 is group ID 1, and a group identifier of group 2 is group ID 2. When the first user taps the "Send" control, content of the first packet generated by the first client is as follows: A sub-message type indicates the one-by-one forwarding, a mapping between a member and a member identifier set (namely, member: [member ID 1, member ID 2]) and a mapping between a group and a group identifier set (namely, group: [group ID 1, group ID 2]) are written into a service header of the sub-message type, and a message list (namely, message 1 and message 2) is written into service data of the sub-message type. Then, the first client sends the first packet to the server, and the server parses and forwards the first packet.

Step S603: The server receives the first packet sent by the first client.

Step S604: The server determines, based on the receiving object identifier set in the first packet, at least one second user that receives the at least one first message.

The second user may indicate a user that receives the first message. There may be one or more second users. Considering that a receiving object of the first message includes a member and/or a group, a member that receives the first message may overlap a member in a group that receives the first message. Therefore, the second user may be a member directly selected by the first user, may be a member in a group selected by the first user, or may be both a member directly selected by the first user and a member in a group selected by the first user. When a member is a member directly selected by the first user instead of a member in a group selected by the first user, the first message only needs to be displayed on a member session interface. When a member is a member in a group selected by the first user instead of a member directly selected by the first user, the first message only needs to be displayed on a group session interface. When a member is both a member directly selected by the first user and a member in a group selected by the first user, the first message needs to be displayed on both a member session interface and a group session interface.

To cover the foregoing scenario, in this embodiment of this application, the member directly selected by the first user and the member in the group selected by the first user may be first determined based on the receiving object identifier set, and then the member directly selected by the first user and the member in the group selected by the first user are merged to obtain the at least one second user. In a possible implementation, step S604 may include: for the member identifier set in the receiving object identifier set, determining a first member set based on the member identifier in the member identifier set; for the group identifier set in the receiving object identifier set, determining at least one first group based on the group identifier in the group identifier set, and determining at least one second member set based on a member identifier of each member included in the at least one first group; and merging the first member set and the at least one second member set to obtain the at least one second user.

Figure 8A:
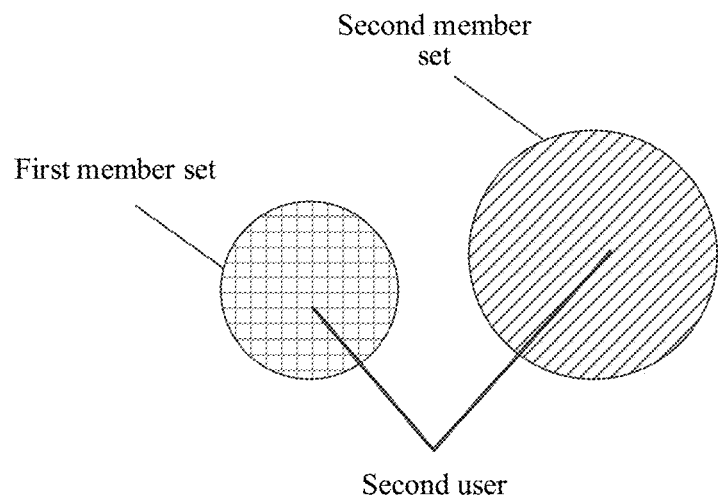
FIG. 8a and FIG. 8b each are a schematic diagram of an example of a second user according to an embodiment of this application.
Figure 8B:
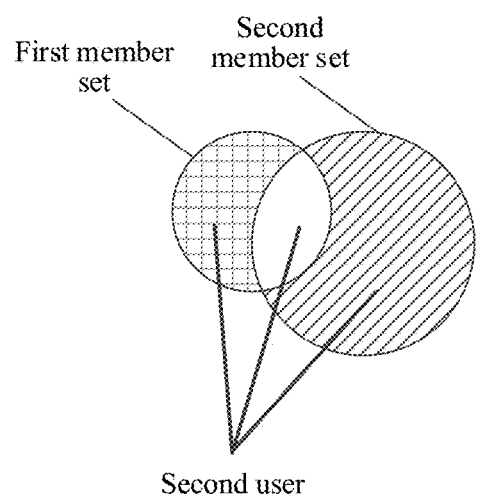

FIG. 8a and FIG. 8b each are a schematic diagram of an example of a second user according to an embodiment of this application. As shown in FIG. 8a, the server determines one first member set and one second member set, and an intersection set between the first member set and the second member set is an empty set (to be specific, a member in the first member set is completely different from a member in the second member set). In this case, the at least one second user includes all members in the first member set and all members in the second member set. As shown in FIG. 8*b*, the server determines one first member set and one second member set, and an intersection set between the first member set and the second member set is not an empty set. In this case, the at least one second user includes a member belonging only to the first member set, a member belonging only to the second member set, and a member belonging to both the first member set and the second member set.

When a member identifier set exists in a receiving object identifier set, it indicates that a receiving object includes a member. Therefore, for the member identifier set in the receiving object identifier set, the server may determine, based on a member identifier in the member identifier set, a member directly selected by the first user, and the member directly selected by the first user forms a first member set. In other words, the first member set may indicate the member directly selected by the first user. In an implementation, a quantity of member identifiers in the member identifier set is the same as a quantity of members in the first member set. It may be understood that when a member identifier set does not exist in a receiving object identifier set, it indicates that a receiving object does not include a member. In this case, no first member set may be generated.

When a group identifier set exists in a receiving object identifier set, it indicates that a receiving object includes a group. Therefore, for the group identifier set in the receiving object identifier set, the server may first determine, based on a group identifier in the group identifier set, at least one first group selected by the first user. Then, for each first group, the server obtains a member identifier of each member in the first group, and further determines a member included in the first group. The member included in the first group forms a second member set corresponding to the first group, to obtain at least one second member set. In an implementation, a quantity of group identifiers in the group identifier set is the same as a quantity of second member sets. It may be understood that when a group identifier set does not exist in a receiving object identifier set, it indicates that a receiving object does not include a group. In this case, no second member set may be generated.

The first member set and the at least one second member set are merged to obtain a second user set, so that each second user receiving the first message may be obtained. In an implementation, the server may use a union set of the first member set and the at least one second member set, to obtain the second user set.

In this embodiment of this application, the first member set may be denoted as $S_{Member}$. A second member set corresponding to a first group whose group identifier is ID n may be denoted as $S_{Group\ ID\ N}$, where a value of n may be an integer greater than 0 and less than or equal to N, and N may indicate a quantity of second member sets. For example, a second member set corresponding to a first group whose group identifier is ID 1 may be denoted as $S_{Group\ ID\ 1}$, a second member set corresponding to a first group whose group identifier is group ID 2 may be denoted as $S_{Group\ ID\ 2}$, and a second member set corresponding to a first group whose group identifier is group ID N may be denoted as $S_{Group\ ID\ N}$. A collection (which may also be referred to as a union set) of all second member sets (including $S_{Group\ ID\ 1}$, $S_{Group\ ID\ 2}$, . . . , and $S_{Group\ ID\ N}$) may be denoted as $S_{Group}$. A collection of $S_{Member}$ and $S_{Group}$ may be denoted as $S_{Second\ user}$. It can be learned that, $S_{Second\ user}$ includes all second users, and the server may determine, by traversing $S_{Second\ user}$, each second user that receives the first message.

Step S605: For any second user of the at least one second user, the server generates a second packet, and sends the second packet to a second client to which the second user logs in.

For each second user in $S_{Second\ user}$, the server may generate a corresponding second packet for the second user, and send the second packet to a second client to which the second user logs in. The second packet includes an identifier of a receiving object corresponding to the second user and the message list obtained from the first packet. In other words, the server copies a message list for each second user. In this embodiment of this application, the message is forwarded in the one-by-one forwarding manner. In this way, the server generates, for each first message in the message list, a message identifier corresponding to the first message. Therefore, the second packet corresponding to each second user further includes the message identifier corresponding to each first message in the message list, so that after receiving the second packet, the second client to which the second user logs in may display each first message one by one.

As described above, one second user exists in the following three scenarios: First, the second user belongs to the first member set and does not belong to the at least one second member set (to be specific, the second user is only a member directly selected by the first user, and is not a member in a group selected by the first user). Second, the second user belongs to the at least one second member set and does not belong to the first member set (to be specific, the second user is only a member in a group selected by the first user, and is not a member directly selected by the first user). Third, the second user belongs to both the first member set and the at least one second member set (to be specific, the second user is both a member directly selected by the first user and a member in a group selected by the first user). Therefore, in this embodiment of this application, the server may traverse the second user. For each second user, the server distinguishes, based on a case in which the second user belongs to the first member set and the second member set, the second user belongs to which one of the foregoing three scenarios, and further determines content of a receiving object identifier set in a second packet generated for the second user.

In a possible implementation, for a second user that belongs to the first member set and does not belong to the at least one second member set, in a second packet generated for the user, an identifier of a receiving object corresponding to the second user includes a member identifier corresponding to the second user.

If the second user belongs to the first member set and does not belong to the at least one second member set, it indicates that the second user is a member directly selected by the first user, but is not a member in a group selected by the first user. Therefore, in the corresponding second packet, the identifier of the receiving object corresponding to the second user includes the member identifier corresponding to the second user, but does not include a group identifier. In an implementation, a receiving object identifier set in the second packet corresponding to the second user includes a member identifier set, and the member identifier set includes the member identifier corresponding to the second user.

In a possible implementation, for a second user that belongs to the at least one second member set and does not belong to the first member set, in a second packet generated for the user, an identifier of a receiving object corresponding to the second user includes a group identifier corresponding to a second member set to which the second user belongs.

If the second user belongs to the at least one second member set but does not belong to the first member set, it indicates that the second user is a member in a first group (or some first groups) selected by the first user, but is not a member directly selected by the first user. Therefore, in the corresponding second packet, the identifier of the receiving object corresponding to the second user includes the group identifier corresponding to the second member set to which the second user belongs, but does not include a member identifier. In an implementation, a receiving object identifier set in the second packet corresponding to the second user includes a group identifier set, and the group identifier set includes the group identifier corresponding to the second member set to which the second user belongs.

In a possible implementation, for a second user that belongs to both the first member set and the at least one second member set, in a second packet generated for the user, an identifier of a receiving object corresponding to the second user includes a member identifier corresponding to the second user and a group identifier corresponding to a second member set to which the second user belongs. In an implementation, a receiving object identifier set in the second packet corresponding to the second user includes a member identifier set and a group identifier set, the member identifier set includes the member identifier corresponding to the second user, and the group identifier set includes the group identifier corresponding to the second member set to which the second user belongs.

Figure 7B:
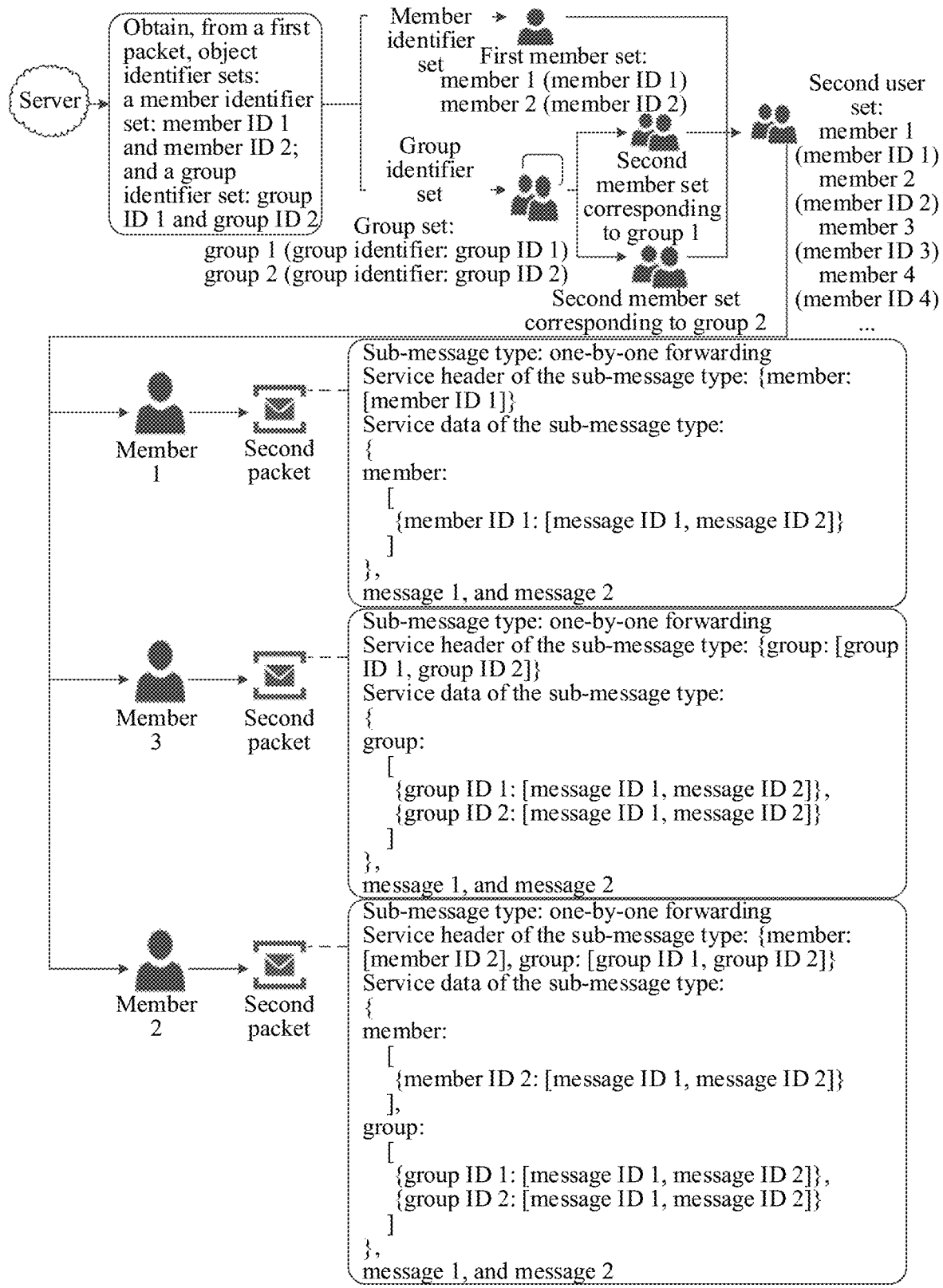
FIG. 7b is a schematic diagram of an example of interaction between a server and a second client.

FIG. 7b is a schematic diagram of an example of interaction between the server and the second client. Based on FIG. 7a-1 and FIG. 7a-2, after receiving the first packet sent by the first client, the server shown in FIG. 7b obtains the member identifier set (including member ID 1 and member ID 2), the group identifier set (including group ID 1 and group ID 2), and the message list (including message 1 and message 2) from the first packet.

As shown in FIG. 7b, the server obtains a first member set based on the member identifier set. The first member set includes member 1 whose member identifier is member ID 1 and member 2 whose member identifier is member ID 2. The server obtains a group set based on the group identifier set. The group set includes group 1 whose group identifier is group ID 1 and group 2 whose group identifier is group ID 2 (where group 1 and group 2 are first groups in step S604). The server may obtain, based on a member included in group 1, a second member set corresponding to group 1, and may obtain, based on a member included in group 2, a second member set corresponding to group 2. Then, the server merges the first member set, the second member set corresponding to group 1, and the second member set corresponding to group 2, to obtain a second user set. The second user set includes at least one second user. The server may generate one second packet for each second user in the second user set.

For example, the second user set includes a second user (namely, member 1) whose member identifier is member ID 1, a second user (namely, member 2) whose member identifier is member ID 2, a second user (namely, member 3) whose member identifier is member ID 3, and a second user (namely, member 4) whose member identifier is member ID 4.

As shown in FIG. 7b, for member 1 in the second user set, the second user belongs to the first member set and does not belong to any second member set. When generating a second packet for the second user, the server sets a sub-message type of the second packet to the one-by-one forwarding, writes a mapping between a member and a member identifier set (namely, member: [member: ID 1]) into a service header of the sub-message type of the second packet, and writes a mapping between a member identifier set, a message identifier, and a message list (namely, {member: [{member ID 1: [message ID 1, message ID 2]}]}, message 1, and message 2) into service data of the sub-message type of the second packet.

As shown in FIG. 7b, for member 3 in the second user set, the second user belongs to the second member set corresponding to group 1 and the second member set corresponding to group 2. When generating a second packet for the second user, the server sets a sub-message type of the second packet to the one-by-one forwarding, writes a mapping between a group and a group identifier set (namely, group: [group ID 1, group ID 2]) into a service header of the sub-message type of the second packet, and writes a group identifier set, a message identifier, and a message list (namely, {group: [{group ID 1: [message ID 1, message ID 2]}, {group ID 2: [message ID 1, message ID 2]}]}, message 1, and message 2) into service data of the sub-message type of the second packet.

As shown in FIG. 7b, for member 2 in the second user set, the second user belongs to the first member set, the second member set corresponding to group 1, and the second member set corresponding to group 2. When generating a second packet for the second user, the server sets a sub-message type of the second packet to the one-by-one forwarding, writes a mapping between a member and a member identifier set (namely, member: [member: ID 2]) and a mapping between a group and a group identifier set (namely, group: [group ID 1, group ID 2]) into a service header of the sub-message type of the second packet, and writes a member identifier set, a group identifier set, a message identifier, and a message list (namely, {member: [{member ID 1: [message ID 1, message ID 2]}], group: [{group ID 1: [message ID 1, message ID 2]}, {group ID 2: [message ID 1, message ID 2]}]}, message 1, and message 2) into service data of the sub-message type of the second packet.

Step S606: The second client receives a second packet sent by the server.

Step S607: The second client displays at least one first message in a message list in the second packet one by one based on an identifier of at least one receiving object in the second packet.

In a possible implementation, step S607 may include: when the identifier of the at least one receiving object includes a member identifier, displaying the at least one first message one by one on a session interface with a first user providing the first message.

When the identifier of the receiving object in the second packet includes the member identifier, it indicates that the second user logging in to the second client is a member directly selected by the first user, and the first user and the second user may directly conduct a member session. Therefore, each first message may be displayed one by one on the session interface with the first user.

In a possible implementation, step S607 may include: when the identifier of the at least one receiving object includes a group identifier, displaying the at least one first message one by one on a session interface of a group corresponding to the included group identifier.

When the identifier of the receiving object in the second packet includes the group identifier, it indicates that the second user logging in to the second client is a member of a first group selected by the first user, and the first user and the second user may conduct a group session through the first group. Therefore, each first message may be displayed one by one on a session interface of the first group.

In a possible implementation, step S607 may include: when the identifier of the at least one receiving object includes both a member identifier and a group identifier, displaying the at least one first message one by one on a session interface with a first user providing the first message and on a session interface of a group corresponding to the included group identifier.

When the identifier of the receiving object in the second packet includes the member identifier and the group identifier, it indicates that the second user is both a member directly selected by the first user and a member of a first group selected by the first user. In this case, the first user and the second user may directly conduct a member session, or conduct a group session through the first group. Therefore, each first message may be displayed one by one on the session interface with the first user, and may be displayed one by one on the session interface of the first group.

Figure 7C:
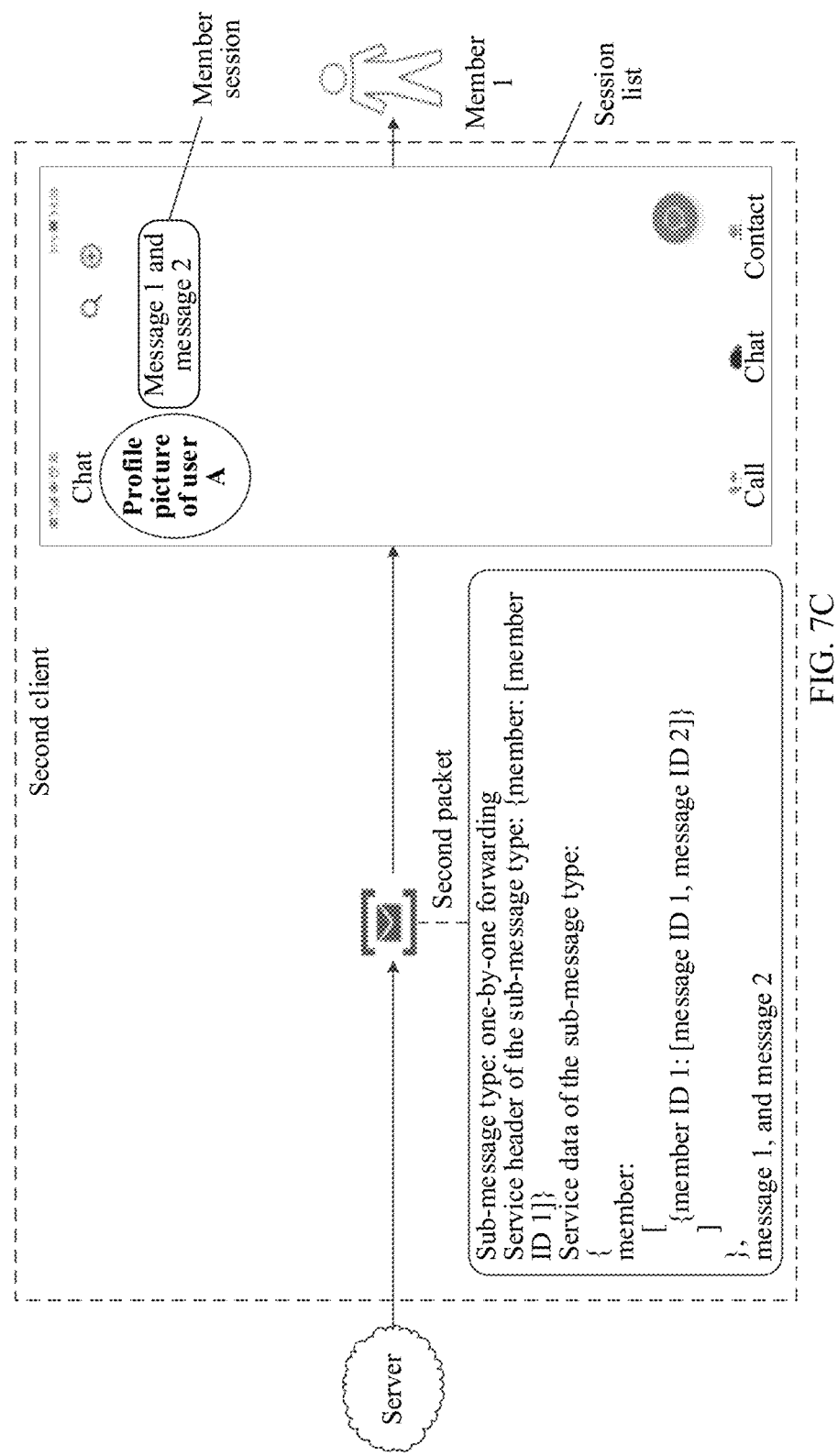
FIG. 7c, FIG. 7d, and FIG. 7e each are a schematic diagram of an example of displaying a first message by a second client.
Figure 7D:
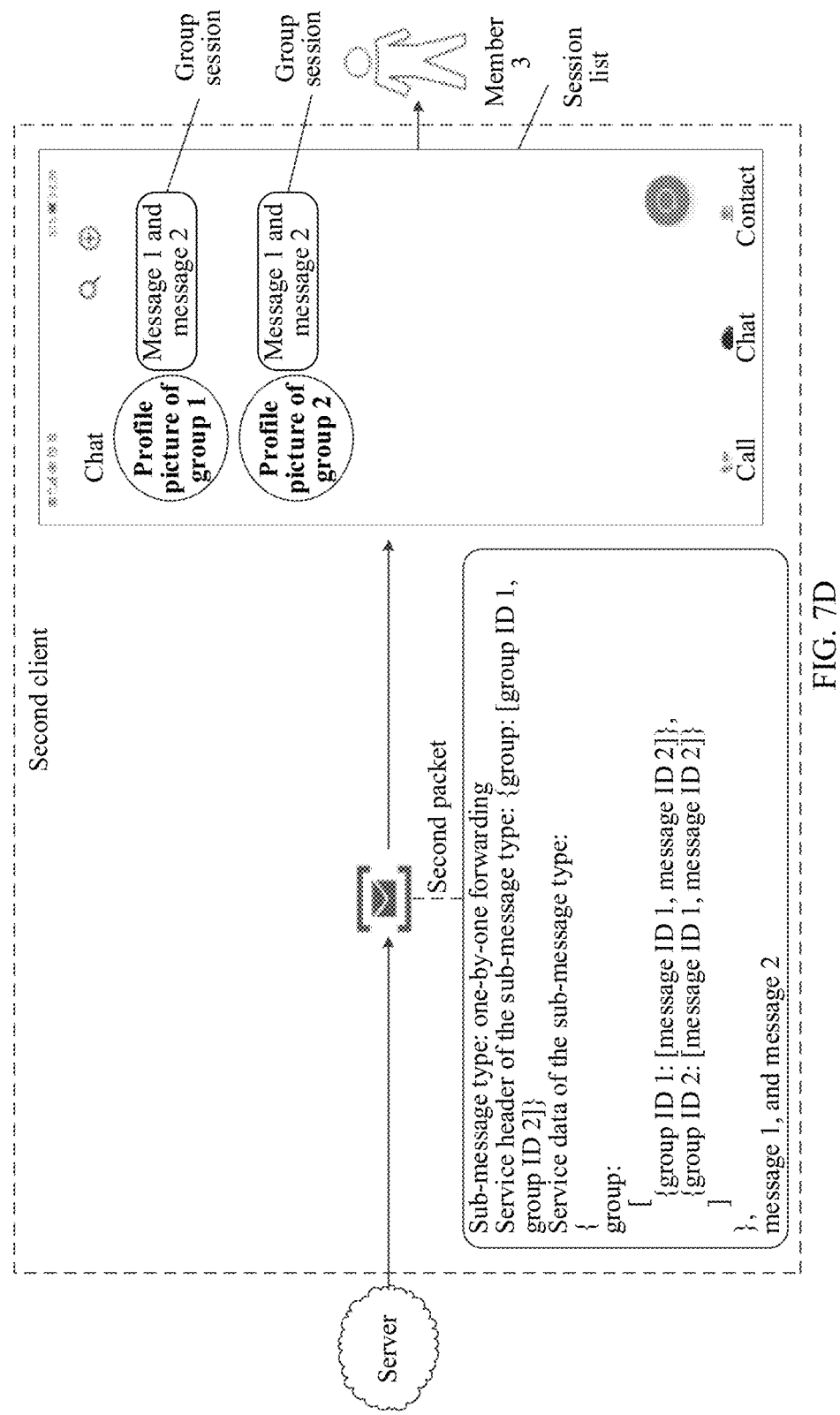
Figure 7E:
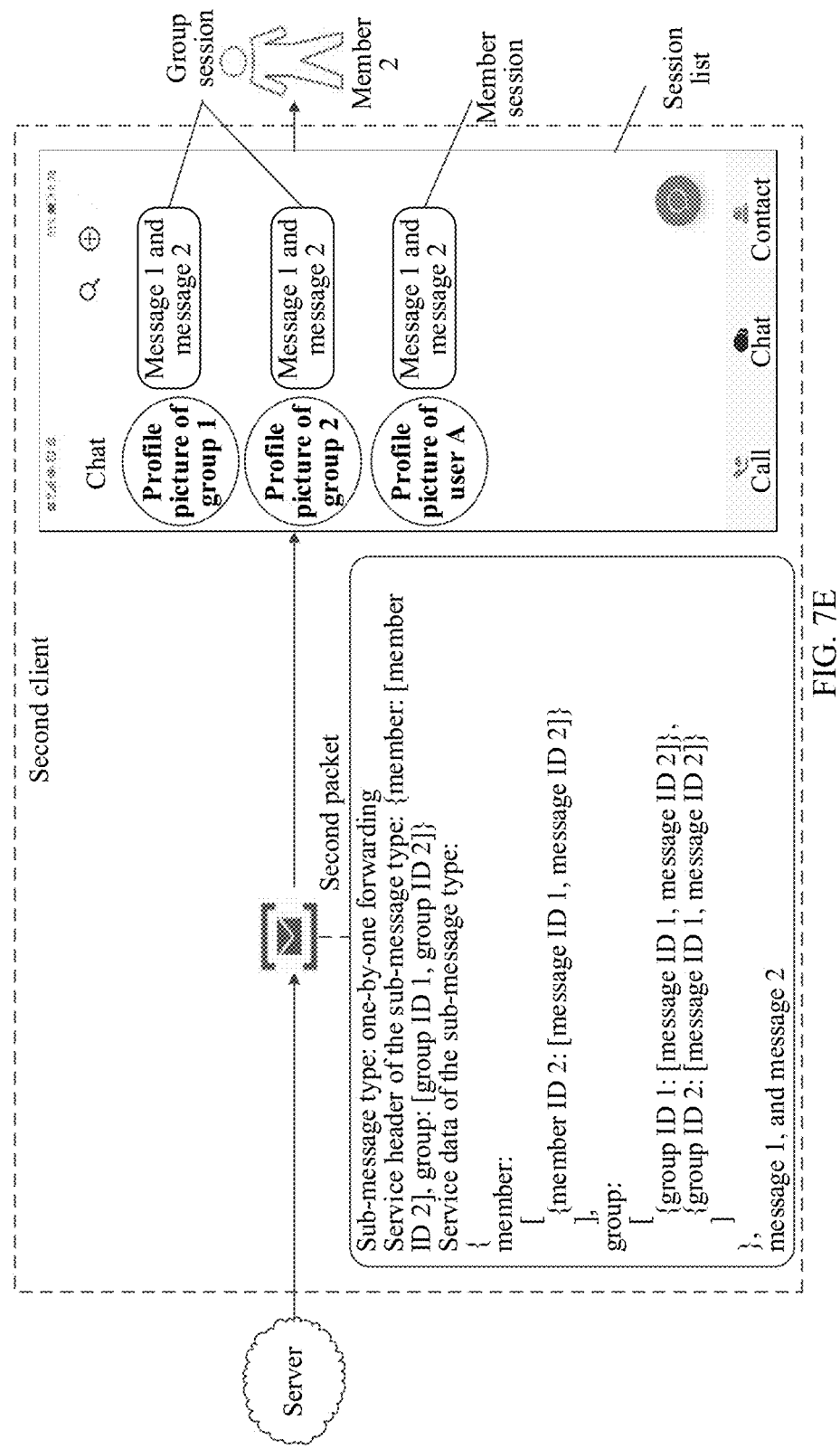

FIG. 7*c*, FIG. 7*d*, and FIG. 7*e* each are a schematic diagram of an example of displaying a first message by a second client. Based on FIG. 7*b*, the second client shown in each of FIG. 7*c*, FIG. 7*d*, and FIG. 7*e* receives the second packet sent by the server.

As shown in FIG. 7*c*, a second client to which member 1 logs in obtains only the mapping between a member and a member identifier set (namely, member: [member: ID 1]) from the service header of the sub-message type of the second packet. It indicates that an identifier of a receiving object in the second packet received by the second client includes only a member identifier, and a second user logging in to the second client is only a member directly selected by the first user. In this case, a session list of the second client only prompts that there is a new message in a member session between the first user and the second user (namely, a member session between user A and user C). After the second user taps the session between the first user and the second user, message 1 and message 2 may be displayed one by one on the session interface.

As shown in FIG. 7*d*, a second client to which member 3 logs in obtains only the mapping between a group and a group identifier set (namely, group: [group ID 1, group ID 2]) from the service header of the sub-message type of the second packet. It indicates that an identifier of a receiving object in the second packet received by the second client includes only a group identifier, and a second user logging in to the second client is only a member of a first group selected by the first user. In this case, a session list of the second client only prompts that there is a new message in group sessions of group 1 and group 2. After the second user taps the group session whose group identifier is group 1 (or taps the group session of group 2), the second client may display message 1 and message 2 one by one on a session interface of the group session of group 1 (or the group session of group 2).

As shown in FIG. 7*e*, a second client to which member 2 logs in obtains both the mapping between a member and a member identifier set (namely, member: [member: ID 2]) and the mapping between a group and a group identifier set (namely, group: [group ID 1, group ID 2]) from the service header of the sub-message type of the second packet, and a second user logging in to the second client is both a member directly selected by the first user and a member of a first group selected by the first user. In this case, a session list of the second client not only prompts that there is a new message in a member session between the first user and the second user (namely, a member session between user A and member C), but also prompts that there is a new message in group sessions of group 1 and group 2. After the second user taps any one of the session between the first user and the second user, the session of group 1, and the group session of group 2, the second client may display message 1 and message 2 one by one on the corresponding session interface.

In this embodiment of this application, when messages are forwarded one by one, the messages are merged, to reduce a quantity of packets uploaded by the client and a quantity of packets delivered by the server, reduce a quantity of times of interaction between the client and the server, and further reduce client traffic consumption.

Figure 9:
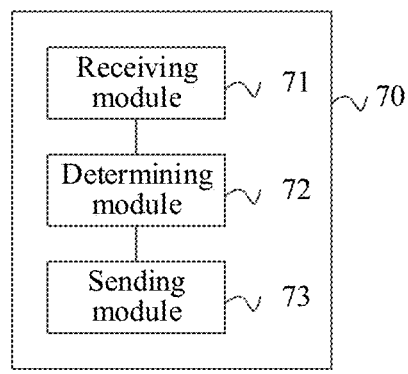
FIG. 9 is a schematic diagram of a structure of a message processing apparatus according to an embodiment of this application.

FIG. 9 is a schematic diagram of a structure of a message processing apparatus according to an embodiment of this application. The apparatus may be used in a server. As shown in FIG. 9, the apparatus 70 may include:

a receiving module 71, configured to receive a first packet sent by a first client, where the first packet includes a receiving object identifier set and a message list, the receiving object identifier set includes an identifier of at least one receiving object, and the message list includes at least one first message;

a determining module 72, configured to determine, based on the receiving object identifier set in the first packet received by the receiving module 71, at least one second user that receives the at least one first message; and a sending module 73, configured to: for any second user of the at least one second user determined by the determining module 72, generate a second packet, and send the second packet to a second client to which the second user logs in, where the second packet includes an identifier of a receiving object corresponding to the second user and the message list.

In a first possible implementation, the at least one receiving object includes a member and/or a group, and the receiving object identifier set includes a member identifier set and/or a group identifier set. The member identifier set includes a member identifier of each member in the at least one receiving object, and the group identifier set includes a group identifier of each group in the at least one receiving object.

The determining module 72 is specifically configured to:
for a member identifier set in the receiving object identifier set, determine a first member set based on a member identifier in the member identifier set;
for a group identifier set in the receiving object identifier set, determine at least one first group based on a group identifier in the group identifier set, and determine at least one second member set based on a member identifier of each member included in the at least one first group; and
merge the first member set and the at least one second member set to obtain the at least one second user.

In a possible implementation, in a second packet generated for a second user that belongs to the first member set, the identifier of the receiving object corresponding to the second user includes a member identifier corresponding to the second user.

In a possible implementation, in a second packet generated for a second user that belongs to the at least one second member set, the identifier of the receiving object corresponding to the second user includes a group identifier corresponding to a second member set to which the second user belongs.

In a possible implementation, in a second packet generated for a second user that belongs to both the first member set and the at least one second member set, the identifier of the receiving object corresponding to the second user includes a member identifier corresponding to the second user and a group identifier corresponding to the second member set to which the second user belongs.

In a possible implementation, the apparatus further includes:
    a generation module, configured to generate, for any first message in the message list, a message identifier corresponding to the first message, where the second packet further includes the message identifier corresponding to the first message.

Figure 10:
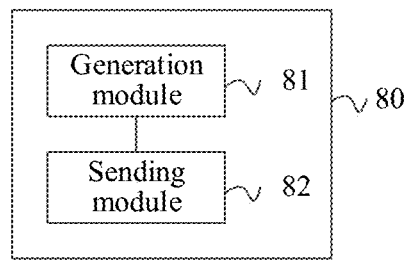
FIG. 10 is a schematic diagram of a structure of a message processing apparatus according to an embodiment of this application.

FIG. 10 is a schematic diagram of a structure of a message processing apparatus according to an embodiment of this application. The apparatus may be used in the first client. As shown in FIG. 10, the apparatus 80 may include:
    a generation module 81, configured to generate a first packet in response to an operation of forwarding at least one first message one by one, where the first packet includes a receiving object identifier set and a message list, the receiving object identifier set includes an identifier of at least one receiving object, and the message list includes the at least one first message; and
    a sending module 82, configured to send the first packet generated by the generation module 81 to a server, to enable the server to forward the at least one first message to the at least one receiving object.

In a first possible implementation, the at least one receiving object includes a member and/or a group, and the receiving object identifier set includes a member identifier set and/or a group identifier set. The member identifier set includes a member identifier of each member in the at least one receiving object, and the group identifier set includes a group identifier of each group in the at least one receiving object.

Figure 11:
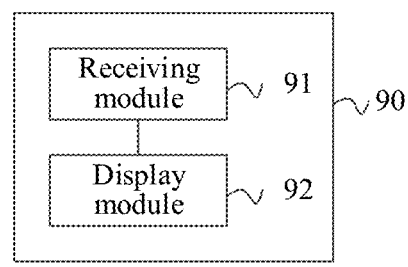
FIG. 11 is a schematic diagram of a structure of a message processing apparatus according to an embodiment of this application.

FIG. 11 is a schematic diagram of a structure of a message processing apparatus according to an embodiment of this application. The apparatus may be used in a second client. As shown in FIG. 11, the apparatus 90 may include:
    a receiving module 91, configured to receive a second packet sent by a server, where the second packet includes an identifier of at least one receiving object and a message list, the message list includes at least one first message, and the identifier of the at least one receiving object includes a member identifier and/or a group identifier; and
    a display module 92, configured to display, based on the identifier of the at least one receiving object in the second packet received by the receiving module 91, the at least one first message in the second packet received by the receiving module 91 one by one.

In a possible implementation, the display module 92 is specifically configured to:
    when the identifier of the at least one receiving object includes the member identifier, display the at least one first message one by one on a session interface with a first user providing the first message.

In a possible implementation, the display module 92 is specifically configured to:
    when the identifier of the at least one receiving object includes the group identifier, display the at least one first message one by one on a session interface of a group corresponding to the included group identifier.

In a possible implementation, the display module 92 is specifically configured to:
    when the identifier of the at least one receiving object includes both the member identifier and the group identifier, display the at least one first message one by one on the session interface with the first user providing the first message and on the session interface of the group corresponding to the included group identifier.

An embodiment of this application provides a message processing apparatus, including a processor and a memory configured to store executable instructions of the processor. The processor is configured to implement the foregoing method when executing the instructions.

An embodiment of this application provides an electronic device, including a processor and a memory configured to store executable instructions of the processor. The processor is configured to implement the foregoing method when executing the instructions.

An embodiment of this application provides a non-volatile computer-readable storage medium, storing computer program instructions. When the computer program instructions are executed by a processor, the foregoing method is implemented.

An embodiment of this application provides a computer program product, including computer-readable code or a non-volatile computer-readable storage medium carrying computer-readable code. When the computer-readable code is run in a processor of an electronic device, the electronic device implements the foregoing method.

The computer-readable storage medium may be a tangible device that may retain and store instructions for use by an instruction execution device. The computer-readable storage medium may be, for example, (but is not limited to) an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk drive, a random access memory (Random Access Memory, RAM), a read-only memory (Read-Only Memory, ROM), an erasable programmable read-only memory (Electrically Programmable Read-Only Memory, EPROM, or flash memory), a static random access memory (Static Random Access Memory, SRAM), a portable compact disc read-only memory (Compact Disc Read-Only Memory, CD-ROM), a digital versatile disc (Digital Video Disc, DVD), a memory stick, a floppy disk, a mechanical coding device, for example, a punched card or a groove protrusion structure that stores instructions, and any suitable combination thereof.

The computer-readable program instructions or code described herein may be downloaded from a computer-readable storage medium to each computing/processing device, or downloaded to an external computer or an external storage device through a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this application may be assembly instructions, instruction set architecture (Instruction Set Architecture, ISA) instructions, machine instructions, machine-related instructions, microcode, firmware instructions, status setting data, or source code or target code written in any combination of one or more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer through any type of network, including a local area network (Local Area Network, LAN) or a wide area network (Wide Area Network, WAN), or may be connected to an external computer (for example, connected through the Internet by using an Internet service provider). In some embodiments, an electronic circuit, for example, a programmable logic circuit, a field programmable gate array (Field Programmable Gate Array, FPGA), or a programmable logic array (Programmable Logic Array, PLA), is customized by using status information of computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the appended drawings illustrate system architectures, functions, and operations of possible implementations of apparatuses, systems, methods, and computer program products according to a plurality of embodiments of this application. In this regard, each block in the flowcharts or the block diagrams may indicate a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC (Application-Specific Integrated Circuit, application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, the disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Embodiments of this application are described above. The foregoing descriptions are examples, are not exhaustive, and are not limited to the disclosed embodiments. Many modifications and changes are clear to a person of ordinary skill in the art without departing from the scope and spirit of the described embodiments. Selection of terms used in this specification is intended to best explain the principles of the embodiments, practical application, or improvements to technologies in the market, or to enable another person of ordinary skill in the art to understand the embodiments disclosed in this specification.

What is claimed is:

1. A message processing method, wherein the method is applied to a server, and the method comprises:
    receiving a first packet sent by a first client, wherein the first packet comprises a receiving object identifier set and a message list, the receiving object identifier set comprises an identifier of at least one receiving object, and the message list comprises at least one first message;
    determining, based on the receiving object identifier set, at least one second user that receives the at least one first message; and
    generating, based on any second user of the at least one second user, a second packet; and
    sending the second packet to a second client to which the second user logs in, wherein the second packet comprises an identifier of a receiving object corresponding to the second user and the message list, wherein:

the at least one receiving object comprises a member or a group, the receiving object identifier set comprises a member identifier set or a group identifier set, the member identifier set comprises a member identifier of each member in the at least one receiving object, the group identifier set comprises a group identifier of each group in the at least one receiving object, and determining, based on the receiving object identifier set, the at least one second user that receives the at least one first message comprises:

for the member identifier set in the receiving object identifier set, determining a first member set based on the member identifier in the member identifier set, for the group identifier set in the receiving object identifier set, determining at least one first group based on the group identifier in the group identifier set, and determining at least one second member set based on the member identifier of each member comprised in the at least one first group, and merging the first member set and the at least one second member set to obtain the at least one second user.

2. The method according to claim 1 wherein:

the second packet is generated for a second user that belongs to the first member set; and the second packet comprises an identifier of a receiving object corresponding to the second user that comprises a member identifier corresponding to the second user.

3. The method according to claim 1 wherein:

the second packet is generated for a second user that belongs to the at least one second member set; and the second packet comprises an identifier of a receiving object corresponding to the second user that comprises a group identifier corresponding to a second member set to which the second user belongs.

4. The method according to claim 1 wherein:

the second packet is generated for a second user that belongs to both the first member set and the at least one second member set; and the second packet comprises an identifier of a receiving object corresponding to the second user that comprises a member identifier corresponding to the second user and a group identifier corresponding to a second member set to which the second user belongs.

5. The method according to claim 1, wherein the method further comprises:

for any first message in the message list, generating a message identifier corresponding to the first message, wherein the second packet further comprises the message identifier corresponding to the first message.

6. The method of claim 1, wherein:

the first packet is generated by the first client in response to an operation of forwarding the at least one first message one by one; and the second packet is configured to enable the second client to display the at least one first message one by one.

7. A message processing method, wherein the method is applied to a second client, and the method comprises:

receiving a second packet sent by a server, the second packet being responsive to a first packet received by the server, wherein the second packet comprises an identifier of at least one receiving object and a message list, the message list comprises at least one first message, and the identifier of the at least one receiving object comprises a member identifier or a group identifier; and displaying the at least one first message one by one based on the identifier of the at least one receiving object by:

in response to the identifier of the at least one receiving object comprising both the member identifier and the group identifier, displaying the at least one first message one by one on a session interface with a first user providing the first message, and on a session interface of a group corresponding to the group identifier, wherein the session interface with the first user is different from the session interface of the group corresponding to the group identifier.

8. The method according to claim 7, wherein displaying the at least one first message one by one based on the identifier of the at least one receiving object further comprises:

in response to the identifier of the at least one receiving object comprising the member identifier, displaying the at least one first message one by one on the session interface with the first user providing the first message.

9. The method according to claim 7, wherein displaying the at least one first message one by one based on the identifier of the at least one receiving object further comprises:

in response to the identifier of the at least one receiving object comprising the group identifier, displaying the at least one first message one by one on the session interface of the group corresponding to the group identifier.

10. The method according to claim 7, wherein the at least one receiving object comprises a member or a group.

11. The method according to claim 7, wherein the second packet comprises an identifier of a receiving object corresponding to a second user that comprises a member identifier corresponding to the second user.

12. The method according to claim 7, wherein the second packet comprises an identifier of a receiving object corresponding to a second user that comprises a group identifier corresponding to a second member set to which the second user belongs.

13. The method according to claim 7, further comprising displaying a session list separately indicating messages related to the session interface with the first user providing the first message, and the session interface corresponding to the group identifier.

14. An electronic device, comprising:

a processor; and a memory with instructions executable by the processor stored therein, wherein, when the instructions are executed by the processor, the electronic device is enabled to:

receive a second packet sent by a server, the second packet being responsive to a first packet received by the server, wherein the second packet comprises an identifier of at least one receiving object and a message list, the message list comprises at least one first message, and the identifier of the at least one receiving object comprises a member identifier or a group identifier; and display the at least one first message one by one based on the identifier of the at least one receiving object by:

in response to the identifier of the at least one receiving object comprising both the member identifier and the group identifier, displaying the at least one first message one by one on a session interface with a first user providing the first message, and on a session interface of a group corresponding to the group identifier, wherein the session interface with the first user is different from the session interface of the group corresponding to the group identifier.

15. The electronic device according to claim 14, wherein the displaying the at least one first message one by one based on the identifier of the at least one receiving object further comprises:

in response to the identifier of the at least one receiving object comprising the member identifier, displaying the at least one first message one by one on the session interface with the first user providing the first message.

16. The electronic device according to claim 14, wherein the displaying the at least one first message one by one based on the identifier of the at least one receiving object further comprises:

in response to the identifier of the at least one receiving object comprising the group identifier, display the at least one first message one by one on the session interface of the group corresponding to the group identifier.

17. The electronic device according to claim 14, wherein the at least one receiving object comprises a member or a group.

18. The electronic device according to claim 14, wherein the second packet comprises an identifier of a receiving object corresponding to a second user that comprises a member identifier corresponding to the second user.

19. The electronic device according to claim 14, wherein the second packet comprises an identifier of a receiving object corresponding to a second user that comprises a group identifier corresponding to a second member set to which the second user belongs.

20. The electronic device according to claim 14, wherein the instructions, when executed by the processor, further enable the electronic device to display a session list separately indicating messages related to the session interface with the first user providing the first message, and the session interface corresponding to the group identifier.

* * * * *